(12) United States Patent
Sato et al.

(10) Patent No.: US 7,857,881 B2
(45) Date of Patent: Dec. 28, 2010

(54) AIR CLEANER FOR TWO-STROKE INTERNAL COMBUSTION ENGINE AND METHOD OF TUNING THE LENGTH OF AIR-FUEL MIXTURE PASSAGE BY USING THE AIR CLEANER

(75) Inventors: Shigeru Sato, Saitama (JP); Kunimune Kawamura, Tokyo (JP); Hidekazu Tsunoda, Tokyo (JP); Kazuhiro Tsutsui, Tokyo (JP)

(73) Assignee: Yamabiko Corporation, Tokyo (JP)

( * ) Notice: Subject to any disclaimer, the term of this patent is extended or adjusted under 35 U.S.C. 154(b) by 332 days.

(21) Appl. No.: 11/946,464

(22) Filed: Nov. 28, 2007

(65) Prior Publication Data

US 2008/0120951 A1    May 29, 2008

(30) Foreign Application Priority Data

Nov. 29, 2006  (JP)  ............................. 2006-321626
Apr. 13, 2007  (JP)  ............................. 2007-105554

(51) Int. Cl.
     B01D 46/00  (2006.01)
(52) U.S. Cl. .............. 55/385.3; 55/DIG. 28; 123/198 E; 123/184.32; 123/579
(58) Field of Classification Search ................ 55/385.3, 55/318, 497, DIG. 28; 123/198 E, 184.32, 123/579; 180/68.1, 219; 451/87, 88, 270, 451/354, 357, 451, 453, 456
See application file for complete search history.

(56) References Cited

U.S. PATENT DOCUMENTS 4,255,176 A * 3/1981 Macrow ...................... 55/415

5,655,497 A * 8/1997 Nakajima ................ 123/198 E
6,395,049 B2 * 5/2002 Knodler et al. ............. 55/385.3
7,361,201 B2 * 4/2008 Nakagome et al. .......... 55/385.3

FOREIGN PATENT DOCUMENTS

JP    2000-170611    6/2000
JP    2001-55958     8/2000

* cited by examiner

*Primary Examiner*—Duane Smith
*Assistant Examiner*—Minh-Chau Pham
(74) *Attorney, Agent, or Firm*—Kilyk & Bowersox, P.L.L.C.

(57) ABSTRACT

An air cleaner is used in a two-stroke internal combustion engine to supply an air-fuel mixture passage and a fresh air passage in a carburetor with air cleaned by an air cleaner element. The air cleaner includes an air cleaner base having an air-fuel mixture opening communicating with the air-fuel mixture passage and a fresh air opening communicating with the fresh air passage, and an air guide member provided at the air-fuel mixture opening. The air guide member is configured to curve near the air-fuel mixture opening and extend from there along the air cleaner base, and has a cross section surrounded by a peripheral wall. The air guide member defines a mixture-use air extension passage for air to be added to prepare an air-fuel mixture air-fuel mixture, which extends from a first clean air intake to the air-fuel mixture opening. Blown-back gas from the air-fuel mixture passage hits against the inner wall of the curved portion of the air guide member, and is therefore restricted to flow out of the first clean air intake and leak into the air cleaner. Thereby, harmful emissions in the exhaust gas from the two-stroke internal engine can be reduced.

10 Claims, 36 Drawing Sheets

AIR CLEANER FOR TWO-STROKE INTERNAL COMBUSTION ENGINE AND METHOD OF TUNING THE LENGTH OF AIR-FUEL MIXTURE PASSAGE BY USING THE AIR CLEANER

The present application claims priority from Japanese Patent Application No. 2006-321626, filed Nov. 29, 2006, and Japanese Patent Application No. 2007-105554, filed Apr. 13, 2007, which are incorporated herein by reference.

FIELD OF THE INVENTION

The present invention generally relates to two-stroke internal combustion engines. More particularly, the present invention relates to an air cleaner for such engines used as a power source of portable power working machines such as chain saws and brush cutters, and to a method of tuning the length of an air-fuel mixture passage by using the air cleaner.

BACKGROUND OF THE INVENTION

Two-stroke gasoline engines have been used as a power source of portable power working machines such as brush cutters, chain saws or the like. In a two-stroke internal combustion engine of this type, a combustion chamber is scavenged by a flow of air-fuel mixture pre-compressed in a crank chamber. More specifically, as the piston ascends, the air-fuel mixture is introduced into the crank chamber; and pre-compressed by the descending piston. Then, during the scavenging stroke, the pre-compressed air-fuel mixture is introduced into the combustion chamber to force the waste combustion gas (exhaust gas) out of the combustion chamber and replace it.

As such, the two-cycle engines are configured to scavenge the combustion chamber by using flows of air-fuel mixture, and therefore involve the problem of "blow-by". That is, a part of the air-fuel mixture, introduced into the combustion chamber and having not burnt, is undesirably discharged away from the combustion chamber together with a combustion gas. This "blow-by" phenomenon makes it difficult to take effective measures for emissions cut of two-stroke engines.

To control the "air-fuel mixture blow-by" phenomenon, a stratified scavenging technique has been proposed in Document 1 (Japanese Laid-open Publication No. 2001-55958) and Document 2 (Japanese Laid-open Publication No. 2000-170611). This stratified scavenging technique is called "initial scavenging by air" as well. Documents 1 and 2 disclose a carburetor including an air-fuel mixture passage for generating air-fuel mixture and an air passage through which fuel-free air (air not containing fuel) passes. In the carburetor disclosed in Documents 1 and 2, air cleaned by an air cleaner common to both passages is supplied to the air-fuel mixture passage and the air passage.

A typical air cleaner for the engine of this kind, as discussed as a conventional example in Document 2 (see FIG. 9 of this document), has a single tubular air intake in communication with both the air-fuel mixture passage and the air passage of the carburetor to supply air to both the air-fuel mixture passage and the air passage through the common air intake. However, as pointed out in Document 2, air-fuel mixture partly pushed back into the air cleaner due to "blow-back" from the air-fuel mixture passage of the carburetor flows into the air passage, thereby causing the fuel to mix with fresh air for use in initial scavenging. This will invite the problem that an unburnt component is discharged from the engine together with combustion gas. Needless to say, this is one of technical problems to be improved in the recent society under an increased request for cleaning or purifying exhaust gas.

To cope with this problem, Document 2 proposes to provide a baffle plate on the common air intake of the air cleaner. More specifically, for the purpose of preventing the air-fuel mixture from flowing into the air passage even though it is pushed back into the air cleaner due to "blow-back" from the air-fuel mixture passage of the carburetor, Document 2 proposes to partition the air intake of the air cleaner communicating with the carburetor into a first air intake communicating with the air-fuel mixture passage of the carburetor and a second air intake communicating with the air passage, using a baffle wall between the first and second air intakes.

SUMMARY OF THE INVENTION

It is desirable to provide an air cleaner for a two-stroke internal combustion engine, which is capable of reducing harmful emissions in exhaust gas.

It is also desirable to provide an air cleaner for a two-stroke internal combustion engine and a method of tuning a length of an air-fuel mixture passage, which can reduce harmful emissions in exhaust gas and can change the engine characteristics simultaneously.

According to an aspect of the present invention, there is provided an air cleaner for a two-stroke internal combustion engine in which a carburetor composes a part of an intake system of the engine and defines an air-fuel mixture passage for preparing air-fuel mixture and a fresh air passage permitting fuel-free fresh air for use in stratified scavenging to pass through, such that the air cleaner supplies the air-fuel mixture passage and the fresh air passage of the carburetor with air cleaned by an air cleaner element, said air cleaner comprising:

an air cleaner base including an air-fuel mixture opening communicating with the air-fuel mixture passage of the carburetor and a fresh air opening communicating with the fresh air passage of the carburetor, and detachably attached to a component of the intake system; and an air guide member provided at the air-fuel mixture opening of the air cleaner base, wherein the air guide member is configured to curve near the air-fuel mixture opening and extend from there along the air cleaner base, and has a cross section surrounded by a peripheral wall, and wherein the air guide member defines a first clean air intake for introducing the cleaned air into the air guide member and defines a mixture-use air extension passage extending between the first clean air intake thereof and the air-fuel mixture opening of the air cleaner base.

A basic concept of the present invention is explained below with reference to FIG. 1. A reference numeral 300 in FIG. 1 denotes an intake system of a stratified-scavenging two-stroke internal combustion engine. Similarly to conventional ones, the intake system 300 includes an air cleaner 302 at its upstream end to supply the two-stroke engine (not shown) with air cleaned by an air cleaner element 304 in the air cleaner 302. The air cleaner 302 comprises an air cleaner base 308 detachably attached to an intake system component (typically a carburetor 306) by bolts, for example, and an outer case 310. The outer case 310 can be removed from the air cleaner base 308 by a relatively simple operation. The air cleaner element 304 can be cleaned or replaced with another by removing the outer case 310 from the air cleaner base 308.

The carburetor 306 includes a fresh air passage 312 through which fuel-free fresh air for stratified scavenging passes, and an air-fuel mixture passage 314 for preparing an air-fuel mixture. The fresh air passage 312 and the air-fuel mixture passage 314 are independent from each other. The air cleaner base 308 includes an air-fuel mixture opening 316 communicating with the air-fuel mixture passage 314 of the carburetor 306, and a fresh air opening 318 communicating with the fresh air passage 312 of the carburetor 306. The fresh air opening 318 and the air-fuel mixture opening 316 are independent from each other.

The air cleaner base 308 includes an air guide member 320. Typically, the air cleaner base 308 and the air guide member 320 are plastic molds. In the example of FIG. 1, the air guide member 320 is firmly fixed to the air cleaner base 308 to be integral therewith. That is, air guide member 320 is not removable from the air cleaner base 308.

The air guide member 320 has a shape curving near the air-fuel mixture opening 316 and extending laterally from there along the air cleaner base 308. Most typically, the air guide member 320 is L-shaped in its side elevational view. The air guide member 320 has a cross section S surrounded by a peripheral wall 320. A part of the peripheral wall 320a may be defined by the air cleaner base 308.

The air guide member 320 has an opening 322 at its distal end. The opening 322 defines a first clean air intake for introducing air cleaned by the air cleaner element 304 into the air guide member 320. The first clean air intake 322 communicates with the air-fuel mixture opening 316 of the air cleaner base 308 via an L-shaped mixture-use air extension passage 324 of the air guide member 320. The term "mixture-use air" is used herein for air to be used for preparation of a air-fuel mixture. FIG. 1 illustrates the air guide member 320 as having a form of a bent tube. However, the first air intake 322 may be widened toward the end in form of a trumpet, or a lengthwise mid portion of the air guide member 320 may be widened, to increase the volume or capacity of the mixture-use air extension passage 324.

Blown-back gas from the air-fuel mixture passage 314 of the carburetor 306 is checked at the curved portion of the air guide member 320 because of the curved passage configuration of the air guide member 320. Thus, the blown-back gas is prevented from flowing externally from the first clean air intake 322 of the air guide member 320 and from leaking into the air cleaner 302. Accordingly, the fuel component in the blown-back gas is restricted to intrude into the fresh air passage 312 of the carburetor 306 through the fresh air opening 318 of the air cleaner base 308. Thereby, harmful emissions in the exhaust gas from the two-stroke internal combustion engine can be reduced.

To reduce the undesirable flow of the fuel component in the blown-back gas into the fresh air opening 318 of the air cleaner base 308, the first clean air intake 322 of the air guide member 320 is preferably disposed apart from the fresh air opening 318 of the air cleaner base 30. In other words, it is preferable to design these members to reserve a long distance D between the first clean air intake 322 and the fresh air opening 318.

As shown in FIG. 1, a plurality of air cleaner bases 308 different in length of the mixture-use air extension passages 324 of the air guide member 320 may be prepared such that any one of these air cleaner bases 308 can be optionally mounted in the engine to tune the engine characteristics in accordance with a users request.

For the benefit of the concept of providing a two-stroke internal combustion engine of particular engine characteristics in accordance with a users request by a simple manner of tuning the length of the mixture-use air extension passage 324 of the air guide member 320, various modifications that make it very easy to tune the engine characteristics can be proposed as shown in FIGS. 2 to 4.

FIG. 2 shows one of such modifications. In the version of FIG. 2, a half member 326 is prepared in relation to the distal portion of the air guide member 320, and the engine characteristics can be tuned by connecting the half member 326 to the air guide member 320. Needless to say, a plurality of half members 326 different in length may be prepared to connect a selected one of them to the distal end of the air guide member 320 to obtain particular engine characteristics pursuant to a user's request.

FIG. 3 shows a second example. In this example, the air guide member 320 can be attached to and detached from the air cleaner base 308. In addition, a plurality of air guide members 320 different in length are prepared to connect a selected one of them to the air cleaner base 308 to tune the engine characteristics pursuant to a users request.

FIG. 4 shows a third example. In this example, the air guide member 320 has a cutout 328 in a distal portion of its peripheral wall 320a, and a complementary peripheral wall member 330 is detachably attached to the peripheral wall 320a to compensate the cutout 328 entirely or partly. According to the third example, when no complementary peripheral wall member 330 is attached, the effective length of the mixture-use air extension passage 324 formed by the air guide member 320 is limited to the length only between the fresh air opening 318 of the air cleaner base 308 and the notch portion 328. In contrast, when the complementary peripheral wall member 330 is attached, the mixture-use air extension passage 324 is elongated by the length of the complementary wall member 330. Accordingly, the engine characteristics can be changed by attaching or not attaching the complementary peripheral wall member 330 to the air guide member 320. Needless to say, a plurality of complementary peripheral wall members 330 different in length may be prepared to attach or not attach a selected one of them to compensate the cutout 328 and thereby obtain particular engine characteristics pursuant to a users request.

Those and other objects, features and advantages of the present invention will become apparent from the description of preferred embodiments that will follow.

DETAILED DESCRIPTION OF THE INVENTION

Figure 1:
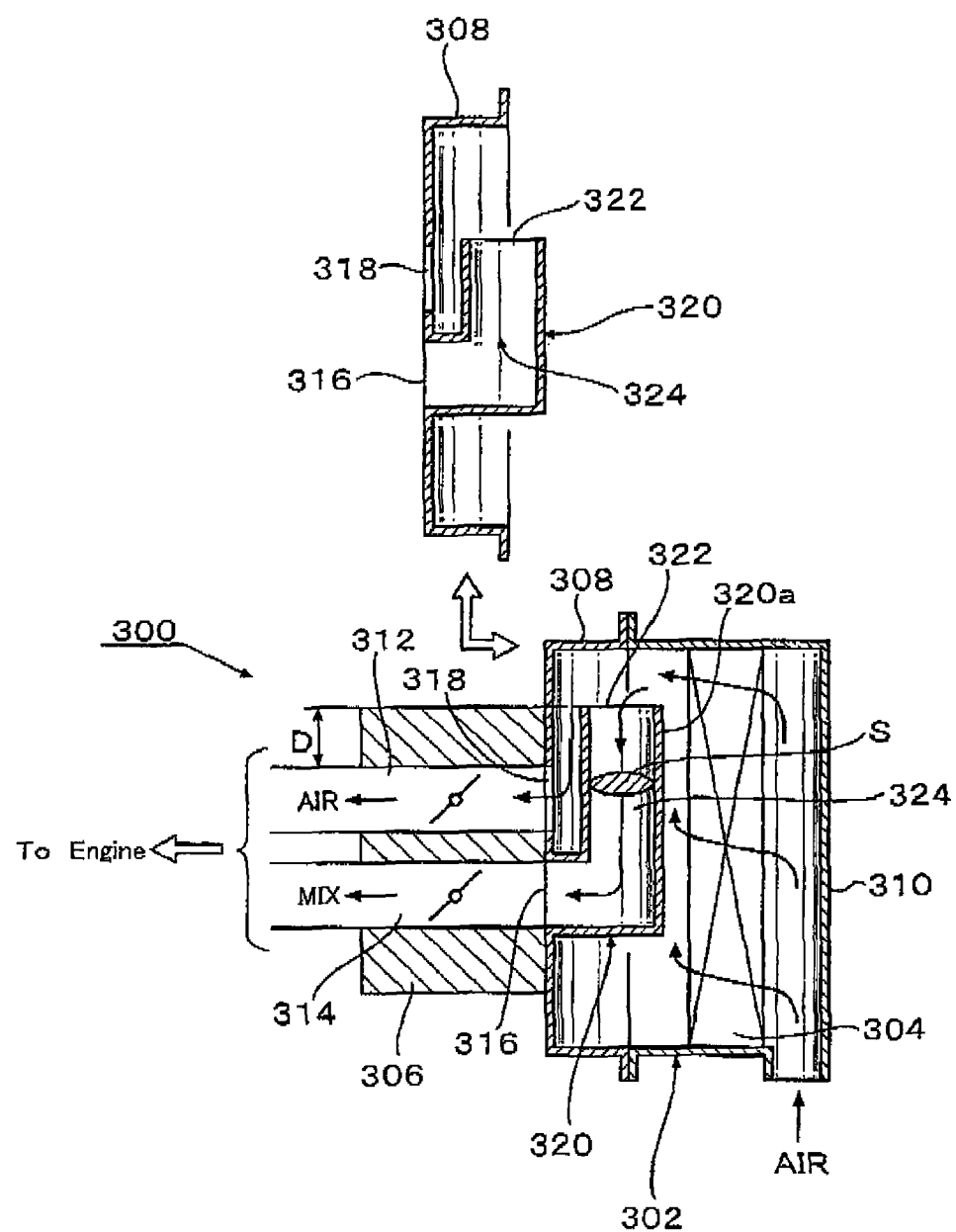
FIG. 1 is a diagram for explaining an example for attaining a concept of the present invention.
Figure 2:
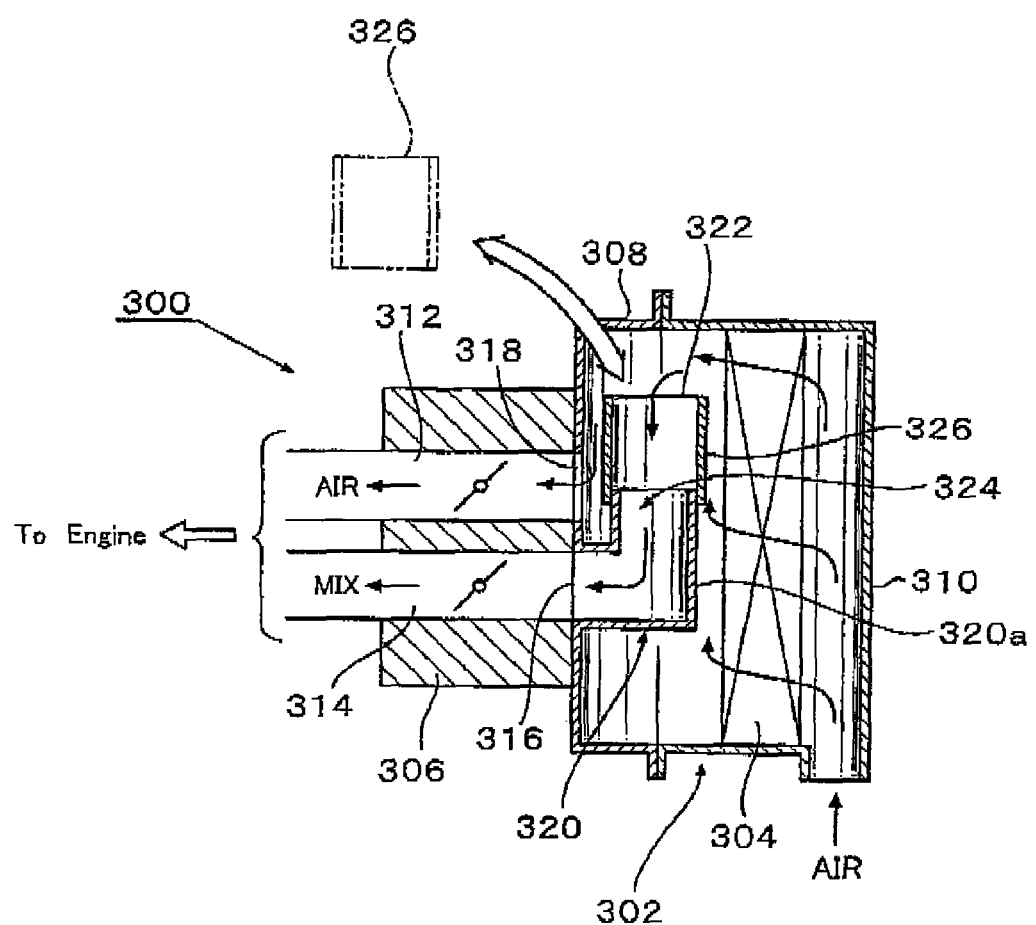
FIG. 2 is a diagram for explaining another example for attaining a concept of the present invention.
Figure 3:
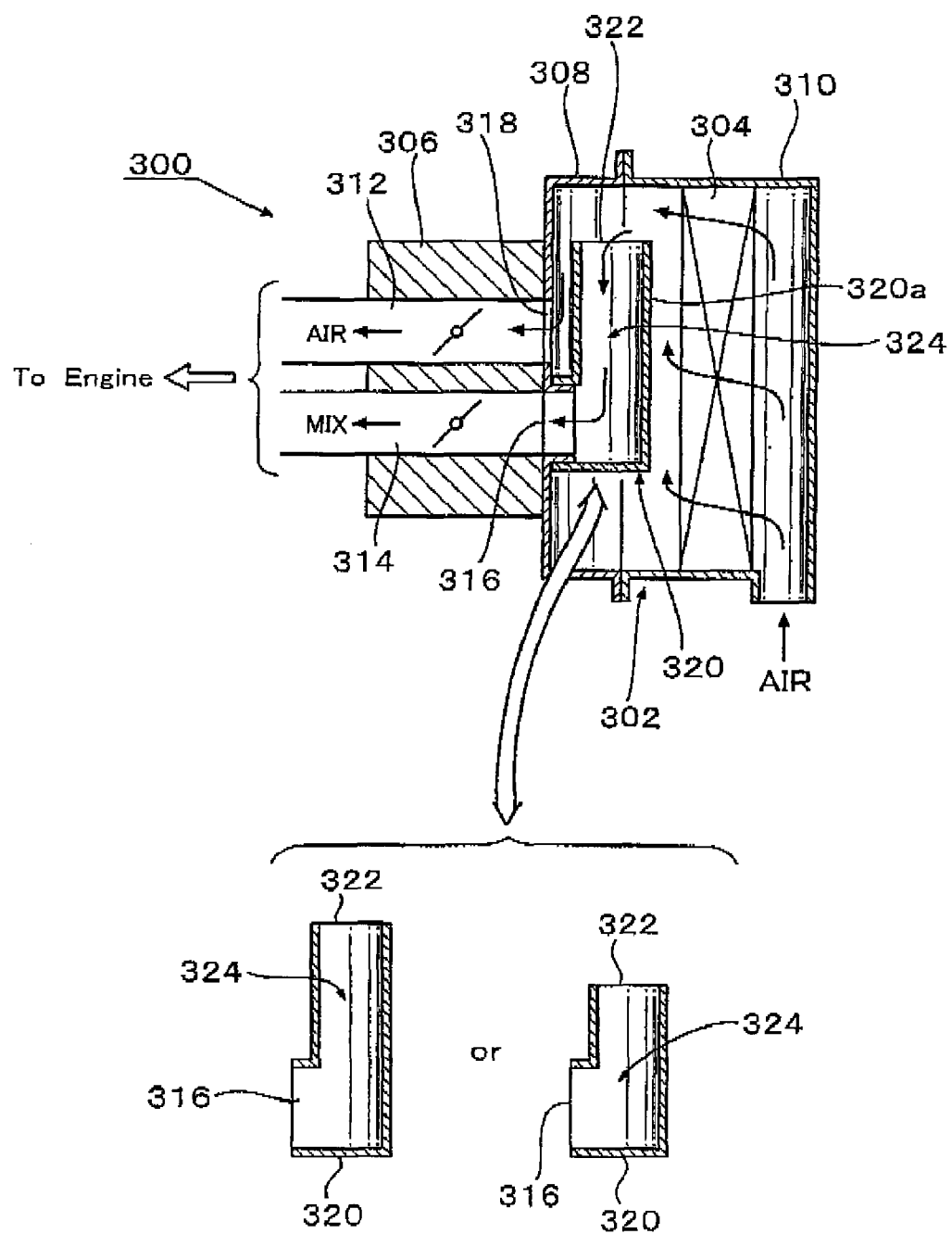
FIG. 3 is a diagram for explaining a third example for attaining a concept of the present invention.

FIGS. 5 to 15 illustrate a two-stroke internal combustion engine suitable for combining an air cleaner according to an embodiment of the present invention. This engine, generally designated with reference numeral 1, is a single-cylinder, four-flow scavenging, air-cooled, compact two-stroke gasoline engine used as a power source of portable power working machines such as brush cutters.

Figure 5:
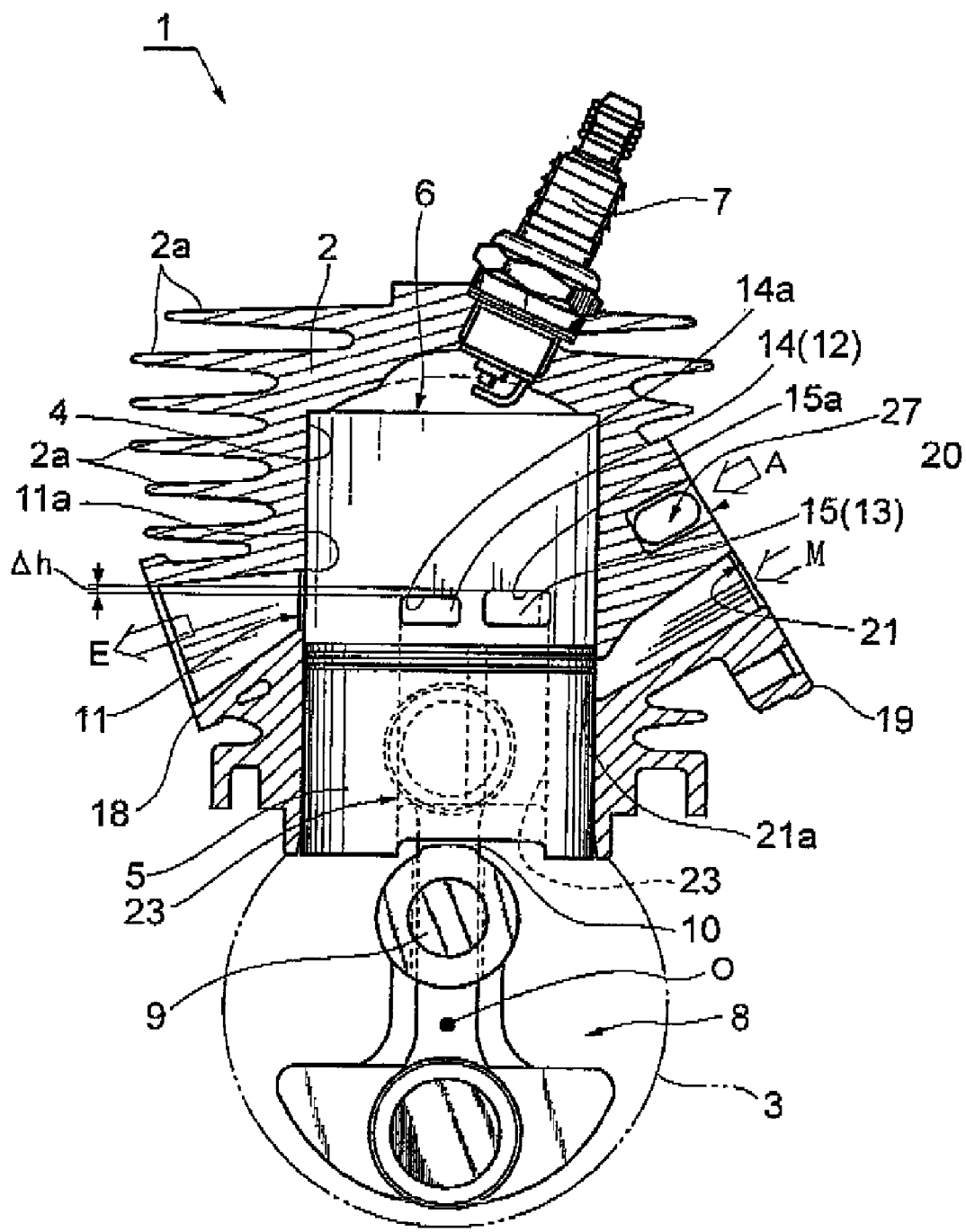
FIG. 5 is a longitudinal sectional view of a two-stroke internal combustion engine suitable for applying an air cleaner according to an embodiment of the invention.

As shown in FIG. 5, the engine 1 includes a cylinder block 2 having cooling fins 2a, and a crank case 3 connected to the bottom of the cylinder block 2. A cylinder bore 4 formed in the cylinder block 2 fittingly receives a piston 5 and permits its reciprocal movement therein. The piston 5 defines a combustion chamber 6 in the cylinder bore 4.

The combustion chamber 6 has a squish-dome (hemispherical) shape. An ignition plug 7 is disposed at the top of the combustion chamber 6. In a crank chamber 8 defined by the crank case 3, a crankshaft 9 is supported for pivotal movement by the crank case 3. In FIG. 5, the reference symbol O indicates the rotation center of the crankshaft 9. The crankshaft 9 and the piston 5 are connected to each other by a connecting rod 10. Reciprocal movement of the piston 5 is converted to rotational movement by the crankshaft 9, and the engine power is output in form of a rotational force of the crankshaft 9.

Figure 6:
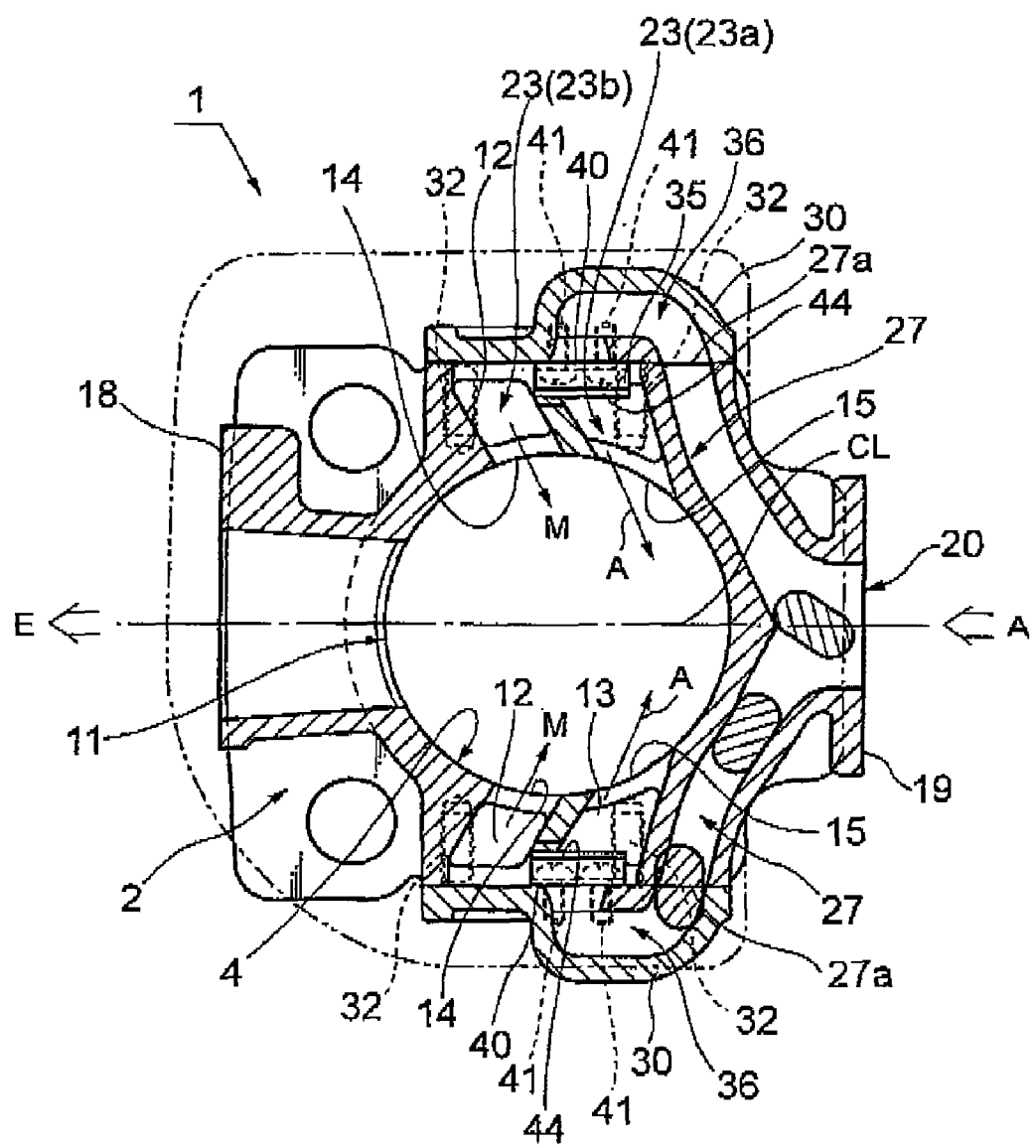
FIG. 6 is a cross-sectional view of the engine shown in FIG. 5.
Figure 9:
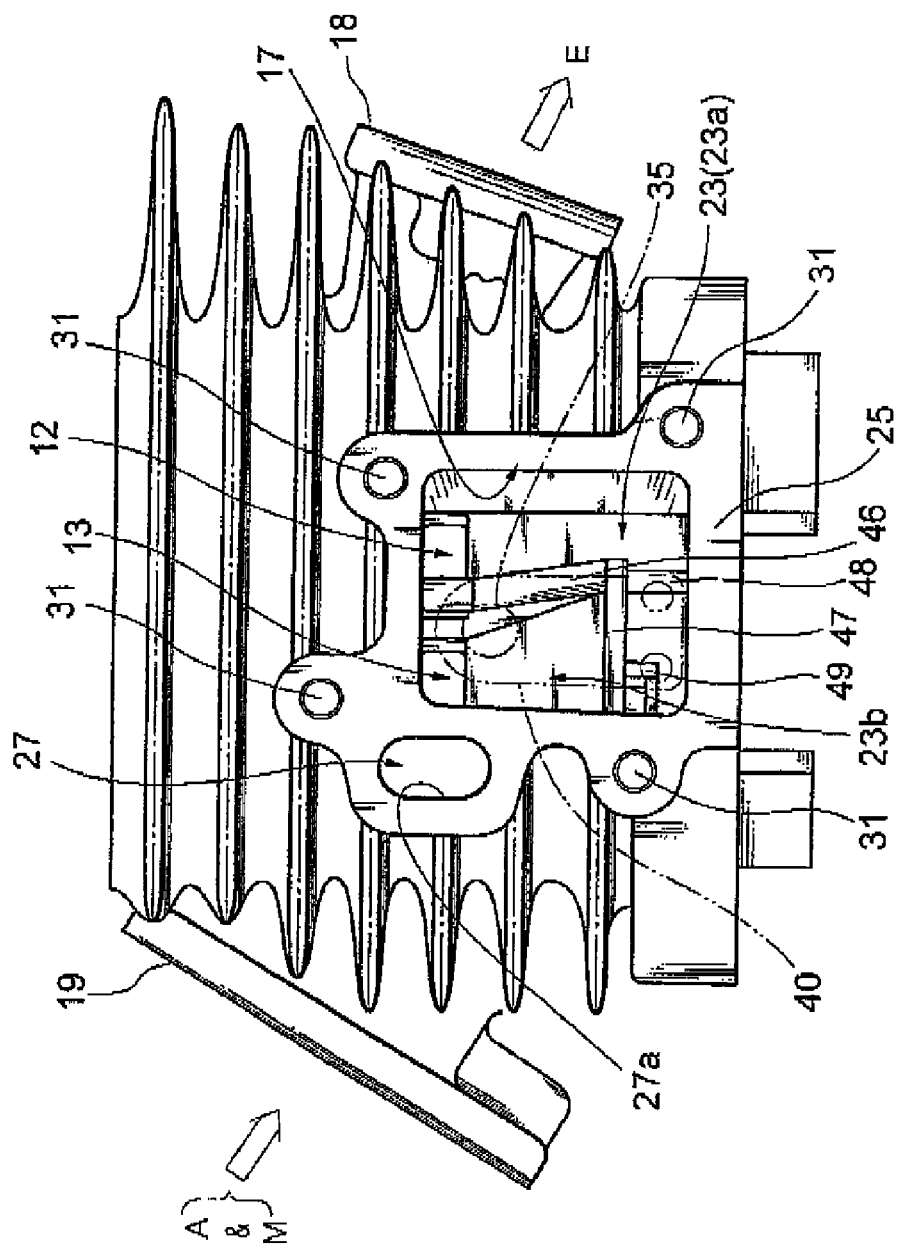
FIG. 9 is a side elevation of the cylinder block for explaining a rectangular opening (in-block passage) that opens at a side portion of the cylinder block.

As shown in FIG. 6 that is a cross-sectional view, the cylinder block 2 has a single exhaust port 11 opening toward the cylinder bore 4 to discharge exhaust gas E. The cylinder block 2 further has a pair of first Schnurle-type scavenging ports 12 and a pair of second Schnurle-type scavenging ports 13 formed therein in bilateral symmetry, respectively, with respect to an imaginary center line CL (see FIG. 6) connecting the center of the exhaust port 11 and the center of the cylinder bore 4. Each of the first and second scavenging ports 12 and 13 is open to outside through a rectangular side opening 17 formed in the cylinder block 2 as shown in FIG. 9.

Referring again to FIG. 5, with regard to the pair of first scavenging ports 12 located relatively nearer to the exhaust port 11 and the pair of second scavenging ports 13 located remoter from the exhaust port, the first and second scavenging ports 12 and 13 have first and second rectangular scavenging windows 14 and 15, respectively, which are open to the cylinder bore 4. All the scavenging windows 14 and 15 are positioned at a level lower than an upper edge 11a of the exhaust port 11. Upper edges 14a and 15a of the first and second scavenging windows 14 and 15 are positioned at different levels from each other as best shown in FIG. 5. The upper edge 14a of the first scavenging window 14 is at a level lower than the upper edge 15a of the second scavenging window 15. In other words, the upper edge 15a of the second scavenging window 15 remoter from the exhaust port 11 is at a level higher by Δh than the first scavenging window 14 nearer to the exhaust port 11 as shown in FIG. 5.

That is, as the piston 5 descends, this two-stroke engine 1 first opens the exhaust port 11, and in the next scavenging stroke, opens the first scavenging port 12 relatively near to the exhaust port 11 after opening the second scavenging port 13 remoter from the exhaust port 11.

Figure 7:
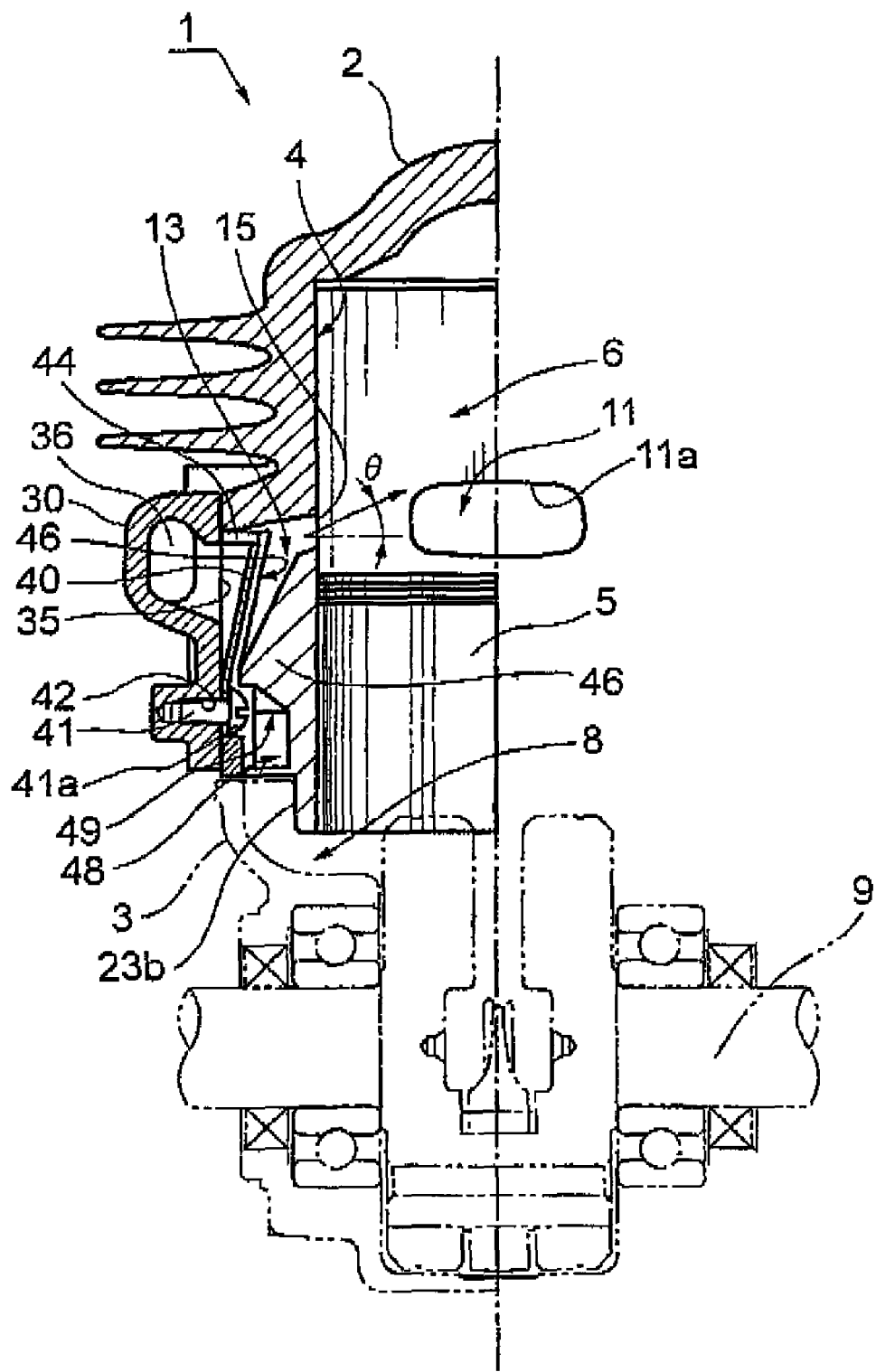
FIG. 7 is a partial longitudinal sectional view for showing a sectional configuration of a second scavenging port of the two-stroke internal combustion engine shown in FIG. 5.

The first and second scavenging ports 12 and 13 are slanted in a direction opposite from the exhaust port 11 when viewed in a horizontal plane as best shown in FIG. 6T and directed upward by an angle θ (angle of elevation) when viewed in a vertical plane as best shown in FIG. 7. Although FIG. 7 shows the second scavenging port 13 alone, the first scavenging port 12 is also directed upward by the angle of elevation.

The angles of elevation of the first and second scavenging ports 12 and 13 may be either equal to, or different from, each other. Preferably, the angle of elevation of the second scavenging port 13 should be set larger than that of the first scavenging port 12.

Figure 8:
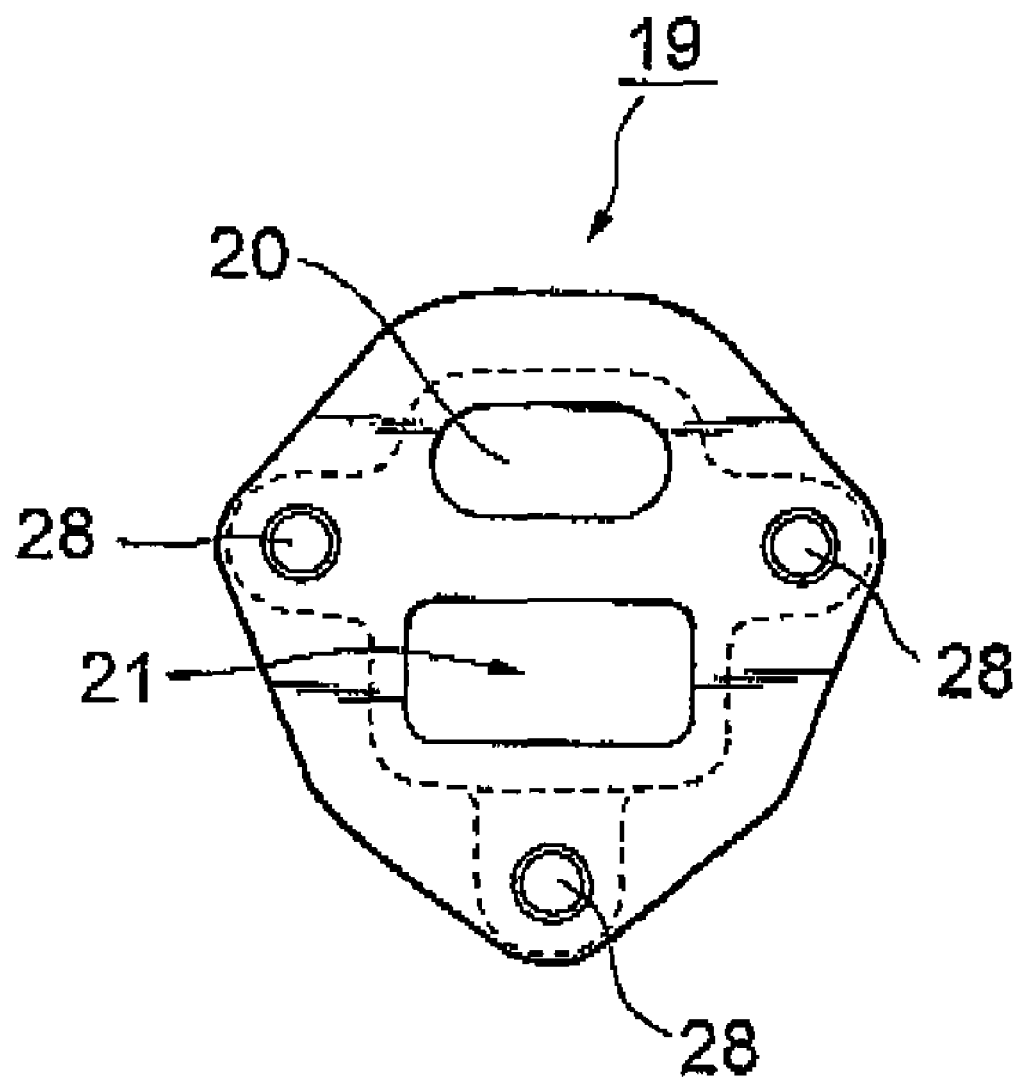
FIG. 8 is a front elevation of an intake-side flange of a cylinder block used in the engine of FIG. 5.

As shown in FIG. 51 the cylinder block 2 has an exhaust-side flange 18 having the exhaust port 11, and an intake-side flange 19 located at a diametrically opposite position. The intake-side flange 19 has two passages 20 and 21 vertically separated from each other. FIG. 8 is a front elevation only of the intake-side flange 19 of the cylinder block 2. Referring to FIG. 5 and FIG. 8, the upper passage 20 has a cross section with its longer axis lying horizontally. The air A containing no fuel (which may be substantially pure air and herein called "fuel-free air" as well) flows through the passage 20. The lower passage 21 has a rectangular cross section (FIG. 8). The air-fuel mixture M flows through the lower passage 21.

Connected to the intake-side flange 19 are intake system components including an air cleaner and a carburetor that will be explained later in detail. Fuel-free fresh air A is supplied from the carburetor to the upper air passage 20 as described in Document 3 (JP 2000-240457) as well, and an air-fuel mixture M is supplied to the lower air-fuel mixture passage 21.

The air-fuel mixture passage 21 communicates with the crank chamber 8 through an air-fuel mixture outlet 21a that is open to the lower end of the cylinder bore 4 as shown in FIG. 5. As the piston 5 ascends, the crank chamber 8 is fed with the air-fuel mixture M through the air-fuel mixture outlet 21a.

Figure 10:
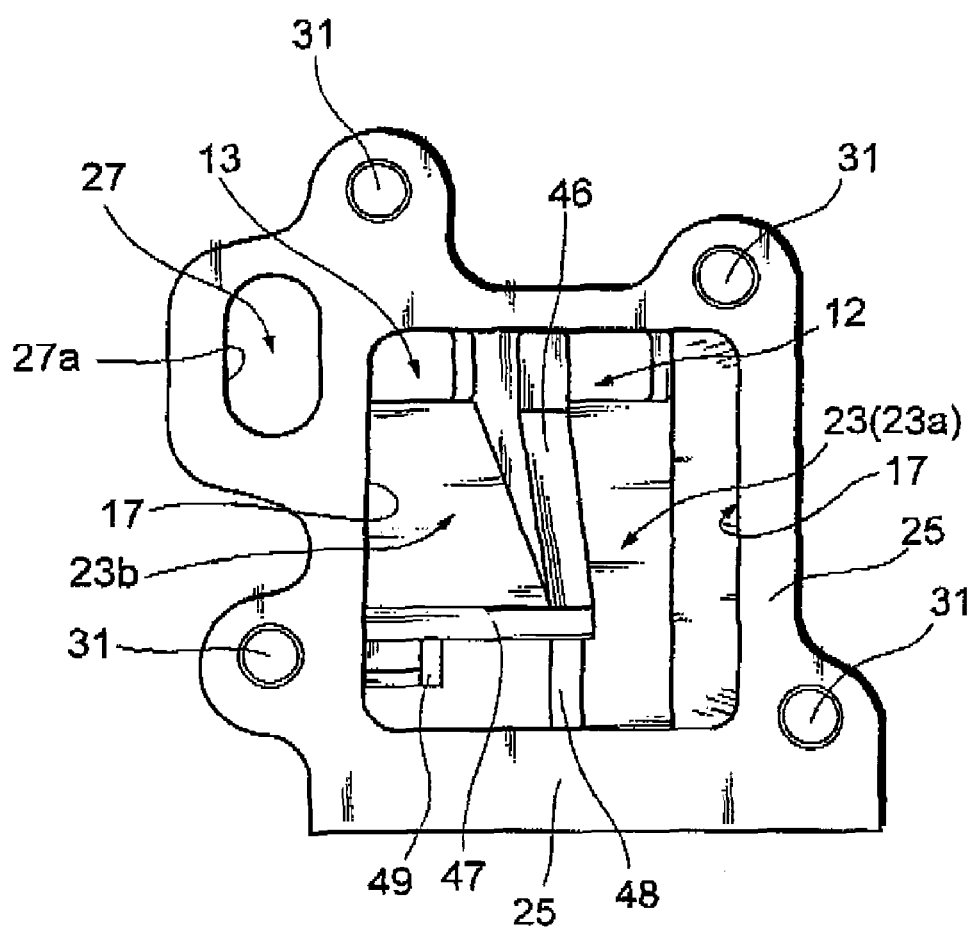
FIG. 10 is an enlarged front elevation of a side flange shown in FIG. 9 especially for explaining the internal structure of the rectangular opening and the side flange formed around the rectangular opening.

The cylinder block 2 has formed therein an in-block passage 23 vertically extending along the cylinder bore 4 as shown in FIGS. 5, 9 and 10. FIG. 10 is a front elevation of a side flange 25 including the rectangular side opening 17 formed in a lateral sidewall of the cylinder block 2. The main function of the in-block passage 23 is to make communication of the first scavenging port 12 nearer to the exhaust port 11 with the crank chamber 8 such that the air-fuel mixture M pre-compressed in the crank chamber 8 can be introduced into the combustion chamber 6

With reference to FIGS. 6 and 8, the air passage 20 is branched into two air inlet paths 27, 27, each terminating at its downstream end 27a opening to the lateral side of the cylinder block 2. In FIG. 6, elliptic figures with hatchings are shown in the air passage 20. These figures demonstrate that the air passage 20 has an elliptic cross section and in which directions the longer axis of the air passage 20 is oriented.

That is, at downstream portions of the inlet paths 27, 27 up to their downstream ends 27a, the air passage 20 exhibits an elliptic cross section with its longer axis extending upright (vertically) when viewed in FIG. 6. Upstream thereof, however, the longer axis of the elliptic cross section gradually inclines, and has an angle of inclination α (FIG. 6) at the portion where the air inlet paths 27, 27 merge. Eventually, the longer axis of the elliptic cross section of the air passage 20 is laid approximately horizontal near the inlet aperture (upstream end of the air passage 20). More specifically, the air inlet paths 27 of the air passage 20 are oriented to lay the longer axis of their elliptic cross section in a lateral direction at the branching point near the upstream end. Thus, the air inlet paths 27, 27 open to the inlet aperture (upstream end of the air passage 20) with an angle of inclination α, and toward the downstream end, the longer axis gradually rises. Then, the longer axis stands upright at a mid course of each air inlet path 27, and keeps the orientation up to the downstream end 27a. That is, the downstream end 27a of each air inlet path 27 has a laterally longer elliptic cross section. In other words, the air inlet paths 27 have the elliptic cross section throughout their entire lengths, and the elliptic cross section is laterally longer at the inlet aperture, and then inclines by angle α at the portion branched from the inlet aperture. Further, the air passage 20 gradually twists toward the downstream such that the elliptic cross section becomes vertically longer at a mid course of each air inlet path 27, and keeps the vertically longer orientation up to the downstream end 27a. The air inlet paths 27 and air outlet portions 27a are adjacent to the cylinder bore 4 and second scavenging ports 13 and extend curvedly along them when viewed in a plane as best shown in FIG. 6. That is, the air passage 20 has a configuration closely fitting the cylinder bore 4 and the second scavenging ports 13 while generally curving along their contours.

Figure 11:
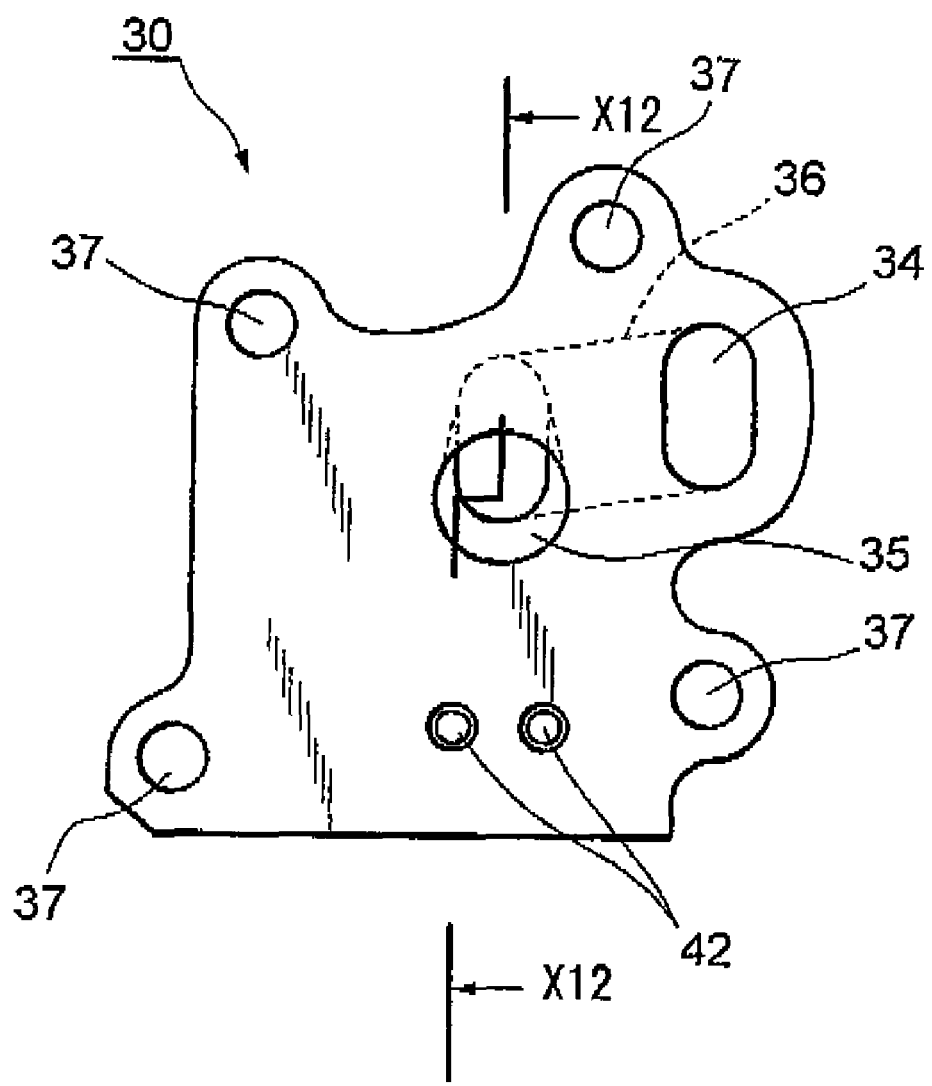
FIG. 11 is a front elevation of a passage-defining member fixed to the cylinder block to define an external air passage.
Figure 12:
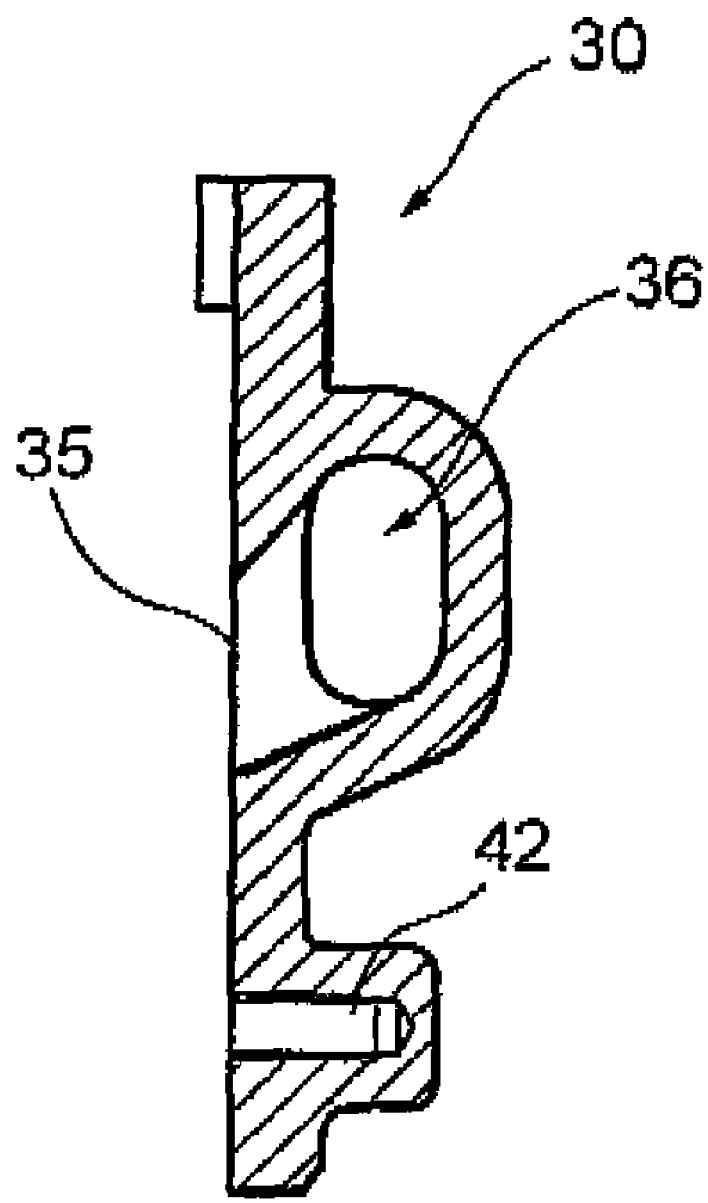
FIG. 12 is a sectional view taken along the X12-X12 line in FIG. 11.

FIGS. 9 and 10 illustrate the side flange 25 provided around the rectangular side opening 17. FIG. 10 is a front elevation of the side flange 25. A passage-defining member 30 is fixed to the side flange 25 (FIGS. 11 and 12). Reference numeral 31 denotes screw holes formed in the side flange 25. The passage-defining-member 30 is fixed to the cylinder block 2 with bolts 32 (shown with an imaginary line in FIG. 6) inserted in individual bolt holes 37 formed in the passage-defining member 30 in alignment with the screw holes 31. Thereby, the rectangular side opening 17 in the cylinder block 2 is covered by the passage-defining member 30.

As shown in FIGS. 11 and 12, the passage-defining member 30 has an outer contour following the shape of the side flange 25 of the cylinder 2. The passage-defining member 30 also has formed therein an inlet opening 34 (FIG. 11) opposed to the air outlet 27a (see FIG. 10) that opens to the side flange 25; an outlet opening 35 (see FIG. 11) opposed to the second scavenging port 13 (FIG. 10); and an external air passage 36 connecting the inlet opening 34 and the outlet openings 35. As shown in FIGS. 10 and 11, the inlet opening 34 has a vertically long elliptic shape. As shown in FIG. 11, the external air passage 38 has a vertically long elliptic cross section as well. On the other hand, the outlet opening 35 is circular (see FIG. 12), and is substantially equal in effective sectional area to the inlet opening 34 and the external air passage 36. In FIG. 11, reference numeral 37 indicates bolt holes for receiving the bolts 32.

Once the passage-defining member 30 is fixed to the cylinder block 2, the second scavenging ports 13 are connected to the air passage 20 (air inlet portion 27), which serves to introduce fuel-free air, via the external air passage 36 of the passage-defining member 30.

As already explained, the fuel-free fresh air A enters into the cylinder block 2 through the air passage 20 having the laterally long elliptic cross section (see FIG. 8). Then, the air A is supplied to the second scavenging ports 13 from the external air passage 36, having the vertically long elliptic cross section there, of the passage-defining member 30 through the air inlet portions 27 each having the laterally long elliptic cross section. More specifically, the passage for supplying fresh air A changes its cross section from a laterally long one to a vertically long one (air inlet portion 27), and maintains the vertically long one in the portion from the air inlet portion 27 to the external air passage 36. Then, the outlet opening 35 of the external air passage 36 that opens to the scavenging port 13 changes to a circular shape. Note that the passageway for guiding the fresh air A to the second scavenging ports 13 is substantially constant in effective sectional area throughout its entire length.

As shown in FIGS. 6 and 7, the passage-defining member 30 has a reed valve 40 and reed valve guide 44 that are fixed thereto by one or more screws 41 (two screws in the illustrated embodiment). The screws 41 are inserted into threaded holes 42 (see FIG. 11) formed in the passage-defining member 30. When the passage-defining member 30 is fixed to the cylinder block 2 with the bolts 32, the screw heads 41a are received within the second scavenging ports 13.

The reed valve 40 is provided at the outlet opening 35 (herein called "downstream opening 35" as well) of the external air passage 36 in the passage-defining member 30 to open and close the outlet opening 35. More specifically, when the pressure in the in-block passage 23 becomes relatively lower, the reed valve 40 is opened and permits the air A to flow into the first and second scavenging ports 12 and 13 through the air passage 20 and the external air passage 36. On the contrary, when the pressure in the first and second scavenging ports 12 and 13 becomes relatively higher, the reed valve 40 is closed and prevents that the gas flows out from the cylinder bore 4 and/or crank chamber 8 through the first and second scavenging ports 12 and 13.

As shown in FIGS. 7, 9 and 10, the in-block passage 23 is partitioned by a first partition wall (vertical) 46 extending vertically into a first inner passage 23a communicating with the first scavenging ports 12 and a second inner passage 23b partly communicating with the second scavenging ports 13. The second inner passage 23b is further partitioned by a second partition wall (horizontal) 47 to restrict the volume in communication with the second scavenging ports 13. That is, only a limited part of the in-block passage 23 is substantially allowed to communicate with the second scavenging ports 13 by the first and second partition walls 46 and 47. The limited portion of the second inner passage 23b in communication with the second scavenging ports 13 serves to store a predetermined amount of fuel-free air A supplied from the intake system for use in scavenging.

The in-block passage 23 has first and second vertical ribs 48, 49. The first rib 48 extends downward from a lower end of the first vertical partition wall 46, which corresponds to an end of the second partition wall 47 extending horizontally. The second rib 49 extends downward from a horizontal mid portion of the horizontal second partition wall 47. Positions of the first and second ribs 48 and 49 are in alignment with positions of the two screws 41 provided to fix the reed valve 40. Alternatively, the first partition wall 46 and/or the second partition wall 47 may be in alignment with the positions of the screws 41. These first and second ribs 48, 49 are located opposed to the two screws 41 or their screw heads 41a respectively. Therefore, the ribs 48, 49 prevent the two screws 41 from dropping inside the crank chamber 8, for example, and thereby causing malfunctions of the engine.

Figure 13:
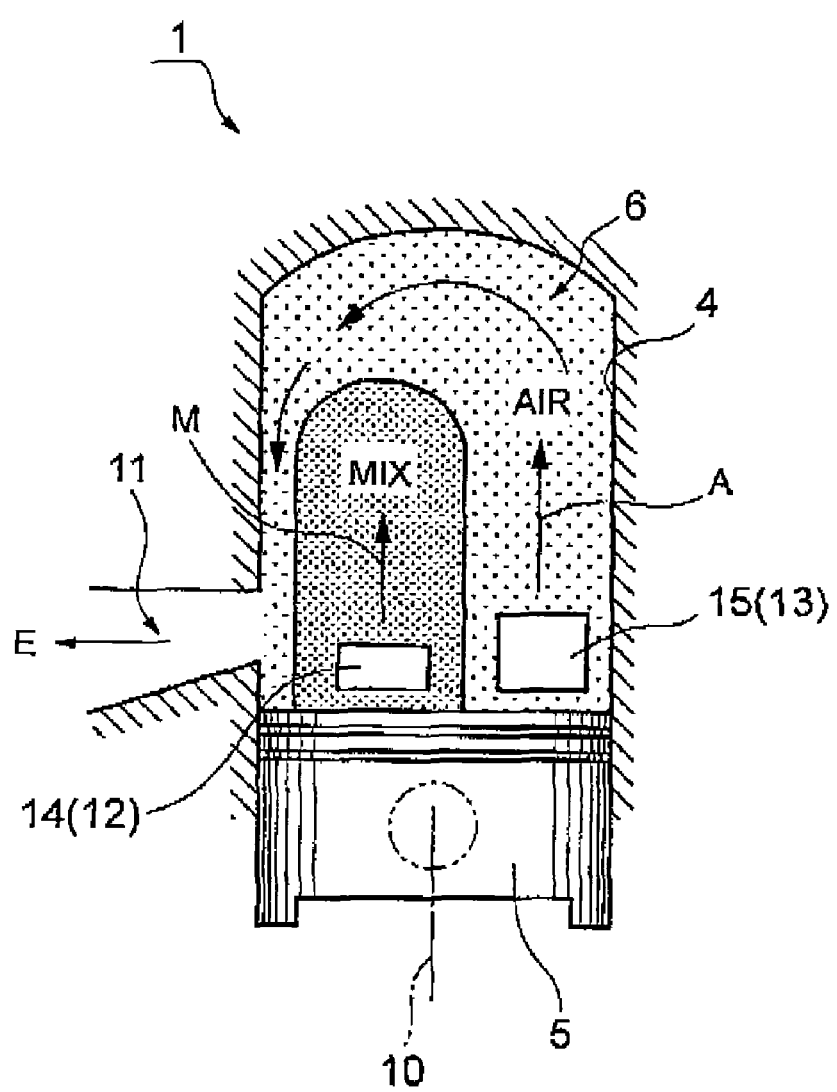
FIG. 13 is a diagram for explaining operations in a scavenging stroke of the two-stroke engine according to embodiments of the invention.

In a scavenging stroke of the above-explained two-stroke internal combustion engine 1, the fuel-free fresh air A is first introduced to the combustion chamber 6 from one of the first and second scavenging ports 12, 13, namely, the second scavenging ports 13, which is remoter from the exhaust port 11. At this time, the fuel-free fresh air A existing in the first scavenging ports 12 is also drawn into the combustion chamber 6. Then, the air-fuel mixture M is introduced into the combustion chamber 6 from the first scavenging ports 12 nearer to the exhaust pot 11. Therefore, the fuel-tree fresh air A introduced from the second scavenging ports 13 results in enveloping the air-fuel mixture M introduced later into the combustion chamber 6 from the first scavenging ports 12 as shown in FIG. 13. This is effective to prevent that the air-fuel mixture M introduced into the combustion chamber 6 and having not burnt is discharged to outside through the exhaust port 11. That is, the so-called "blow-by" phenomenon is prevented.

Figure 14:
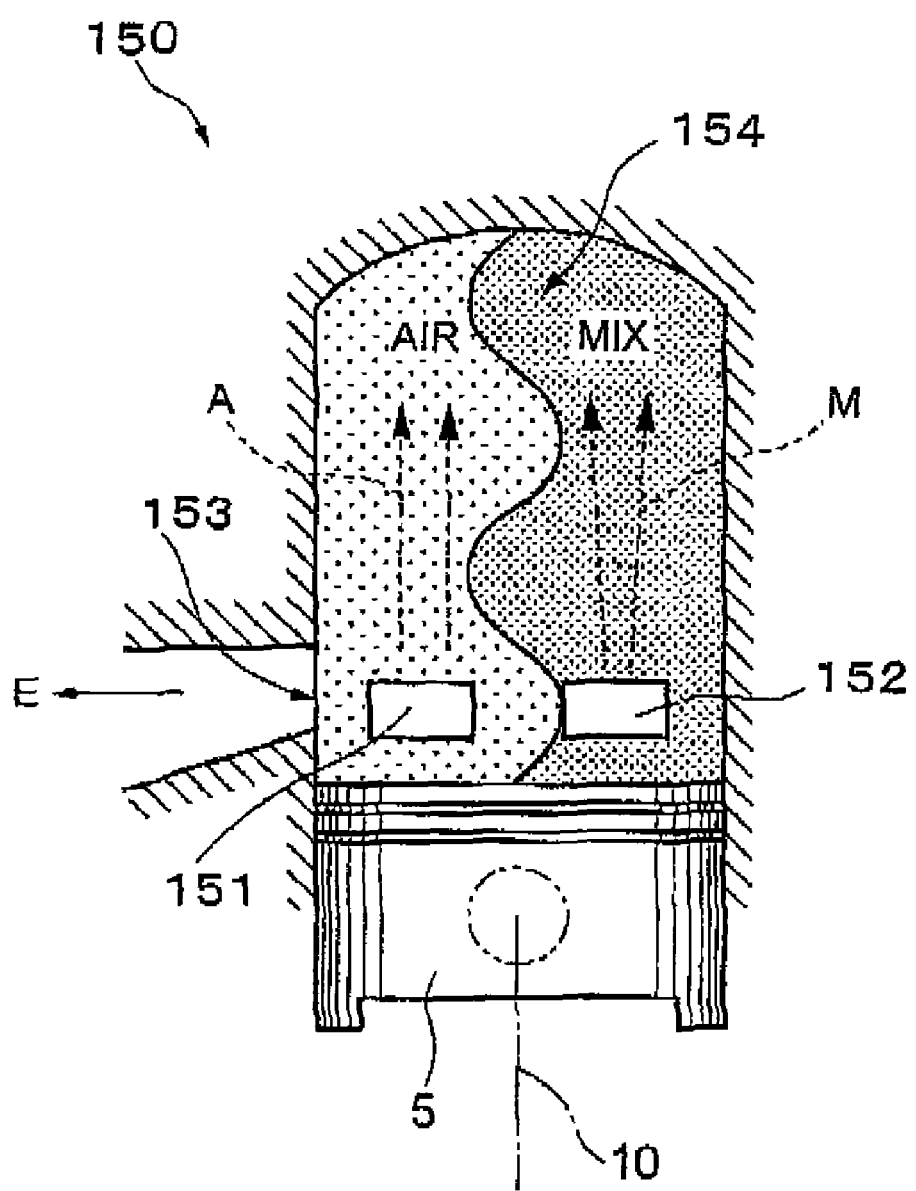
FIG. 14 is a diagram for explaining operations in a scavenging stroke of a conventional two-stroke engine taken as a comparative example.

FIG. 14 shows a conventional two-stroke internal combustion engine 150 as a comparative example. The conventional engine 150 is so designed that fuel-free air A is introduced into a combustion chamber from one of first scavenging ports 151 and second scavenging ports 152, namely from the first scavenging ports 151 that are nearer to an exhaust port 153, and an air-fuel mixture M is introduced from the second scavenging ports 152 located remoter from the exhaust port 153. In this conventional scavenging system, the air-fuel mixture M and fuel-free air A are not separated distinctly from each other in the combustion chamber 154. Therefore, the mixture M is much more likely to flow out through the exhaust port 153.

Figure 15:
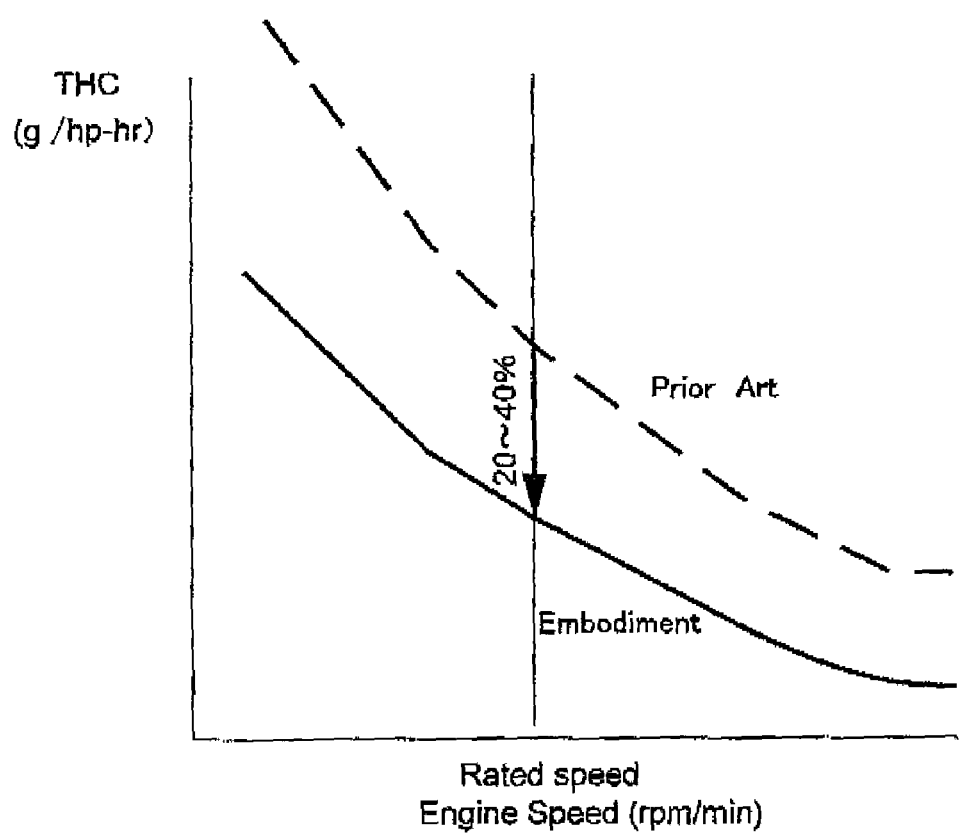
FIG. 15 is a diagram for explaining effects of purifying exhaust gas from the two-stroke engine according to embodiments of the invention.

To confirm the exhaust gas purification effect of the two-stroke internal combustion engine according to the present invention, an engine 1 according to the embodiment shown in FIG. 5 and a conventional engine 150 (see FIG. 14) were prepared which are common in basic design factors such as engine displacement, cylinder bore size, etc. These engines 1 and 150 were compared in amount of unburnt gas components contained in exhaust gases from them. The result of comparison is shown in FIG. 15. This shows approximately 20% to 40% cutdown of unburnt gas components by the engine 1 according to the present invention.

As explained above, in the two-stroke internal combustion engine 1 according to the embodiment of the present invention shown in FIG. 5 and others, the fuel-free fresh air A first introduced into the combustion chamber 6 through the second scavenging ports 13 located remoter from the exhaust port 11 makes loops in the combustion chamber 6, and envelopes with these loops the air-fuel mixture M introduced later into the combustion chamber 6. Therefore, it is possible to suppress the "blow-by" of the air-fuel mixture M better than the conventional engine 150 and to reduce harmful components in the exhaust gas E.

Furthermore, in the two-stroke internal combustion engine 1 explained above, the passage-defining member 30 is fixed to the cylinder block 2 to supply the second scavenging ports 13 with air A. In addition to this, the air inlet portions 27 (see FIG. 6) for guiding the fresh air A to the second scavenging ports 13 have an elliptic cross section longer in an up-and-down direction, and have a configuration generally curved to fit contours of the cylinder bore 4 and the second scavenging port 13 in a tight and close fitting relation with them. Furthermore, the air inlet portions 27 are formed inside the cylinder block 2 to be adjacent to the cylinder bore 4 and the second scavenging ports 13. Therefore, the cylinder block 2 can be designed more compact than conventional engines in which air inlet portions are circular in cross section and extend straight.

Moreover, the two screws 41 fixing the reed valve 40 and the reed valve guide 44 in each second scavenging port 13 are restrained from loosening to droppage by the ribs 48 and 49 that are adjacent to the screw heads 41a inside the engine. Hence, it is possible to restrict the screws 41 from dropping into the crank chamber 8 due to engine vibrations and to prevent damages that might be otherwise caused by such screws if they drop down into the crank chamber 8.

Figure 16:
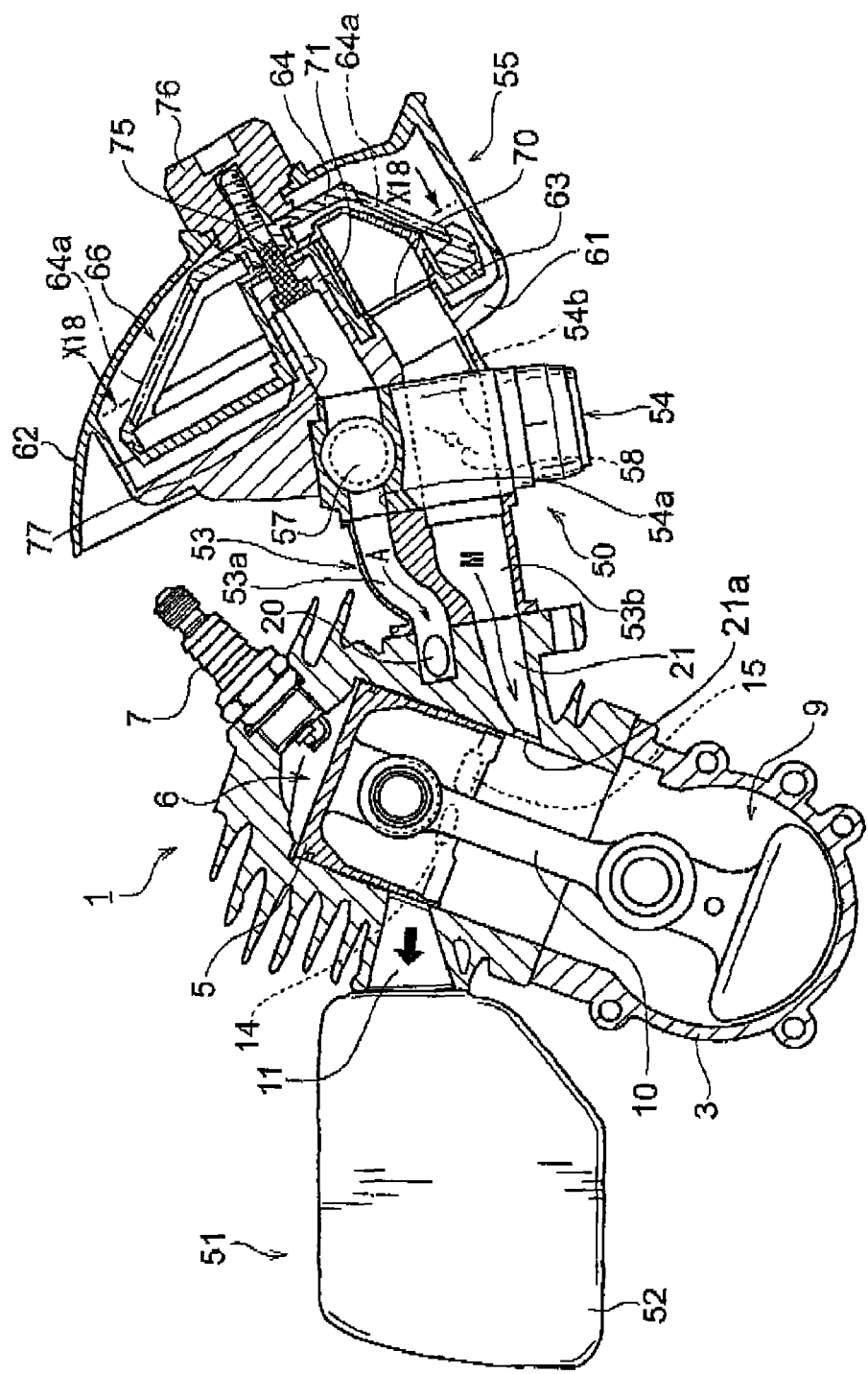
FIG. 16 is a sectional of an engine including intake system components and exhaust system components such as an air cleaner according to the first embodiment to the engine of FIG. 5.

FIG. 16 shows the two-stoke engine 1 of FIG. 5 combined with an intake system 50 and an exhaust system 51. With reference to FIG. 16, the exhaust system 61 comprises a muffler 52 connected to the exhaust port 11 of the engine 1 similarly to conventional engines.

The intake system 50 comprises an adaptor 53, carburetor 54 and air cleaner 55 that are connected in this order from nearest to the engine toward the upstream. The adaptor 53 defines therein a fresh air passage 53a and an air-fuel mixture passage 53b that are independent from each other. The fresh air passage 53a of the adaptor 53 communicates with the air passage 20 of the engine 1, while the air-fuel mixture passage 53b is connected to the air-fuel mixture passage 21 of the engine 1.

The carburetor 54 has a fresh air passage 54a and an air-fuel mixture passage 54b formed independently from each other. Similarly to conventional engines, gasoline is supplied from a fuel tank, not shown, to the air-fuel mixture passage 54b to prepare air-fuel mixture M.

Figure 17:
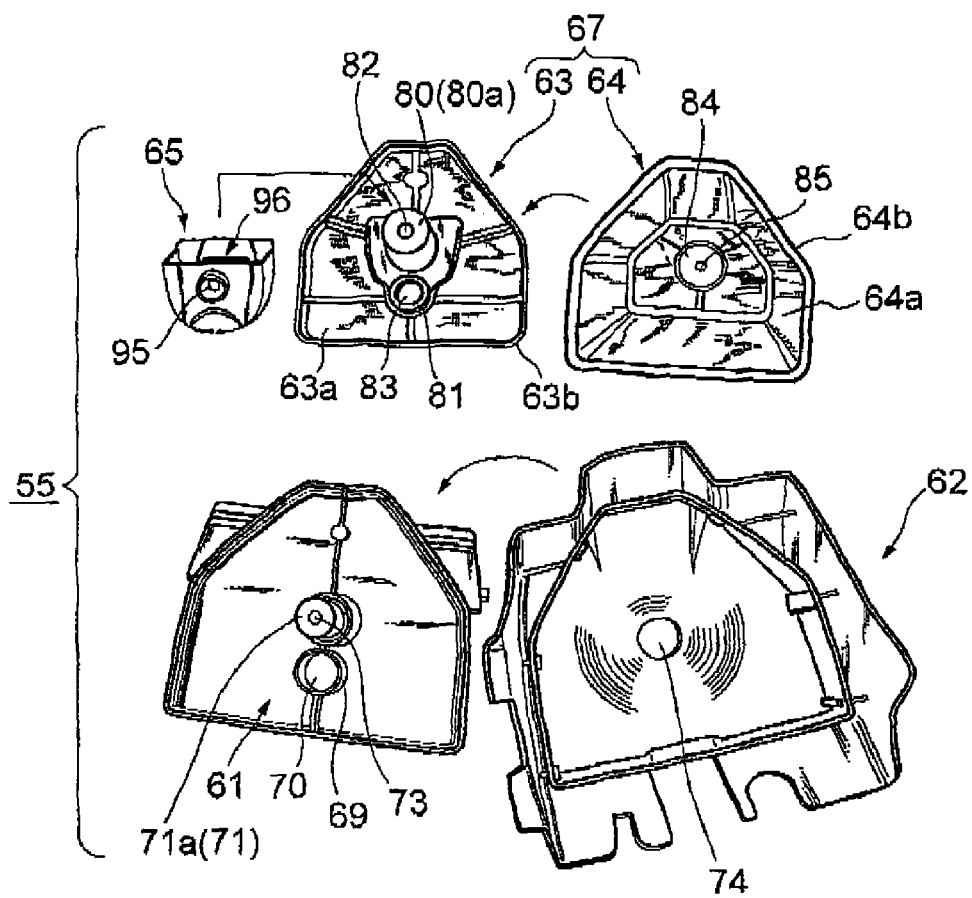
FIG. 17 is a diagram showing that the air cleaner according to the first embodiment is composed of five elements.

The fresh air passage 5a and the air-fuel mixture passage 54b of the carburetor 54 includes throttle valves 57, 58, respectively. The output of the engine 1 is controlled by changing the opening rate of the throttle valve 58 of the air-fuel mixture passage 54. The valves 57, 58 may be either butterfly valves or rotary valves. The air cleaner 55 is connected to the upstream end of the carburetor 54. FIG. 17 shows the air cleaner 55 composed of five components 61 to 65 that are plastic molds.

First Embodiment

FIGS. 17 to 23

With reference to FIG. 17, the air cleaner 55 includes an air cleaner base 61 and an outer case 62 that, in combination, define an air cleaner chamber 66 (FIG. 16). An air cleaner element 67 composed of a lower element 63 and an upper element 64 is held in a predetermined position within the air cleaner chamber 66. Filters 63a, 64a that may be plastic molded nets, meshed fabric, or paper sheets having fine bores, and held on frames 63b, respectively, are fixed to the lower element 63 and the upper element 64.

The air cleaner base 61 is detachably connected to the upstream end of the carburetor 54 by bolts (not shown). With reference to FIG. 17, the air cleaner base 61 has an air-fuel mixture opening 70 enclosed by an upright tubular circumferential flange 69. The air-fuel mixture opening 70 is disposed in alignment with a position of the air-fuel mixture passage 54b of the carburetor 54. Although both the air-fuel mixture opening 70 and the circumferential flange 69 have a circular outline respectively when viewed in a horizontal plane in the instant embodiment, they may be modified to have a rectangular or elliptic outline.

The air cleaner base 61 further includes a hollow first tubular boss 71 disposed adjacent to the circumferential flange 69. The first tubular boss 71 opens at its bottom, and communicates with the fresh air passage 54a of the carburetor 54. At the upper end, however, the first tubular boss 71 is closed by a top wall 71a. In the instant embodiment, the first tubular boss 71 has a circular outline when viewed in a horizontal plane. However, a rectangular or an elliptic outline is acceptable as well. The top wall 71a of the first tubular boss 71 has a bolt hole 73. For combination with the bolt hole 73, the outer case 62 has a second bolt hole 74. As seen from FIG. 16, the outer case 62 is detachably mounted by a combination of a bolt 75 inserted from inside the first tubular boss 71 and a nut 76.

Figure 18:
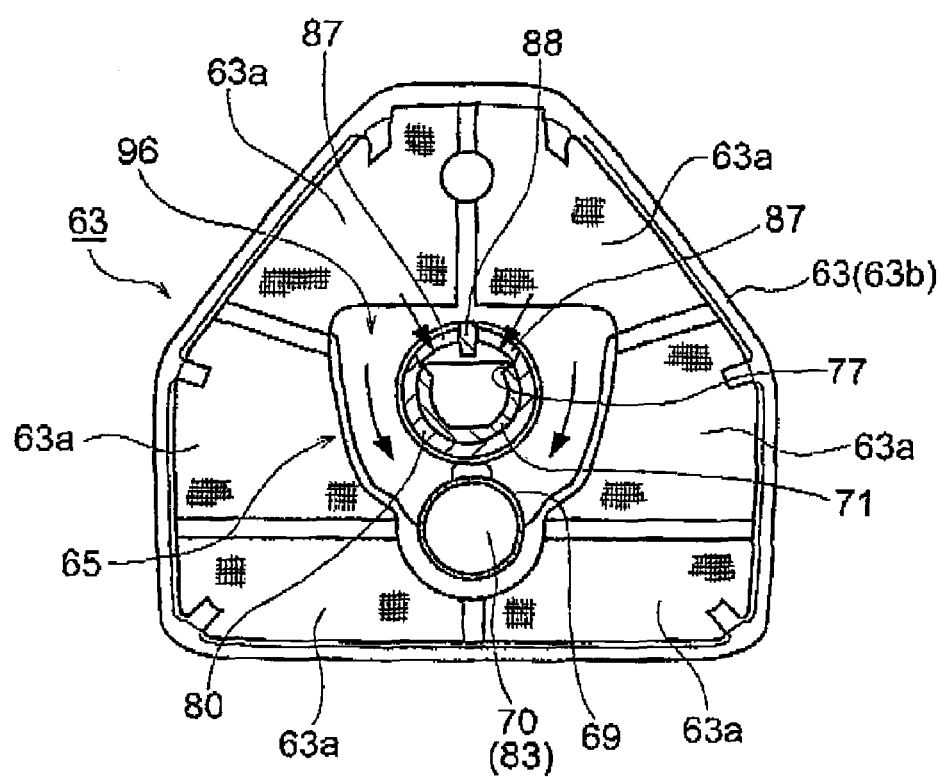
FIG. 18 is a sectional view taken along the X18-X18 line of FIG. 16.

As best seen from FIGS. 16 and 18, the tubular boss 71 includes a fresh air opening 77 corresponding to a cutout of a surface of the tubular boss 71. The fresh air opening 77 opens oppositely from the air-fuel mixture opening 70. Note that FIG. 18 is a sectional view taken along a X18-X18 line of FIG. 16.

Once the lower and upper elements 63, 64 are put together, the hollow air cleaner element 67 enclosed by the meshed films 63a, 64a with fine pores is set up. FIG. 17 illustrates the lower element 63 in its front view and the upper element 64 in its back view.

The air cleaner element 67 is held in position by the first tubular boss 71 of the air cleaner base 61 and the circumferential flange 69. That is, the lower element 63 includes a second tubular boss 80 complementary with the first tubular boss 71 of the air cleaner base 61, and a second circumferential flange 81 complementary with the air circumferential flange 69 of the air cleaner base 61. A first vent 83 encircled by the second circumferential flange 81 is formed in a position corresponding to the mixture-use air opening (herein pertains to an opening for air to be used to prepare an air-fuel mixture) 70 of the air cleaner base 61. The bottom of the second tubular boss 80 is opened downward whereas its top wall 80a has a second bolt hole 82. The top wall 80a of the lower element 63 should be brought into contact with a center plate 84 of the upper element 64. A third bolt hole 85 formed in the center plate 84 should be in alignment with the second bolt hole 82 of the top wall 80a of the lower element 63. Thus, the bolt 75 is inserted into the second and third bolt holes 82, 85. The second tubular boss 80 has a second vent 87 (FIG. 18) formed in the sidewall opposite from the second circumferential flange 81. The second inlet 87 is located for alignment with the fresh air opening 77 of the air cleaner base 61. Although the second inlet 87 is partitioned to right and left parts by a vertical rib, this is optional.

Among five components 61 to 65 of the air cleaner 55 in FIG. 17, the component designated by reference numeral 65 is an air guide member. That is, the air cleaner 55 further includes the air guide member 65 that is detachable as explained later.

Figure 19:
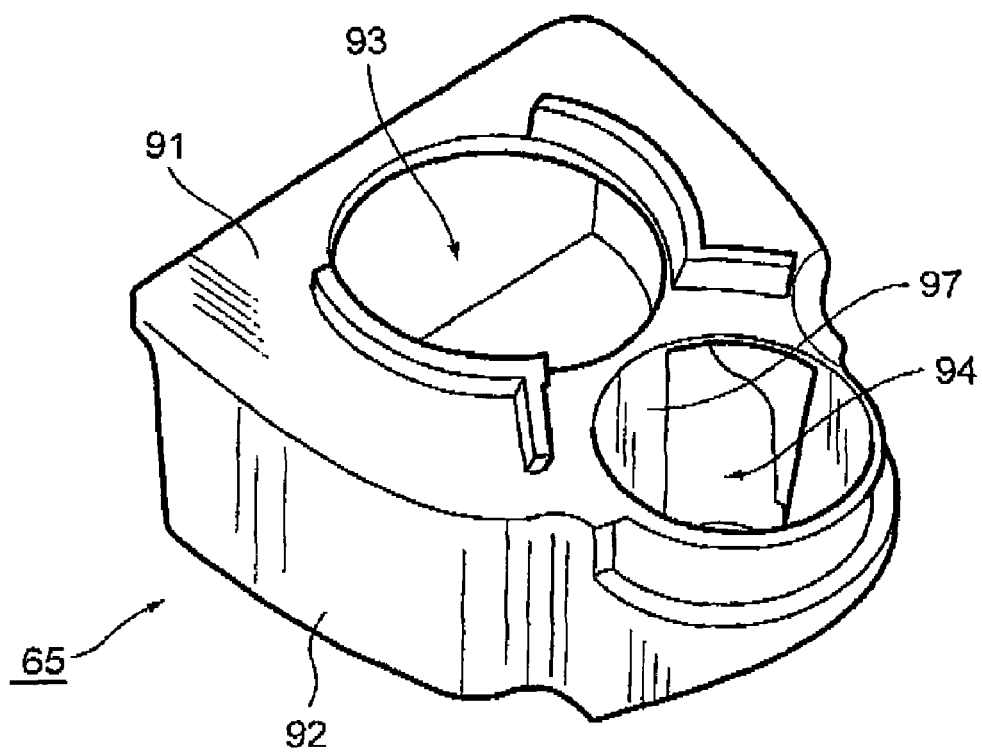
FIG. 19 is a perspective view of an air guide member that is an element of the air cleaner according to the first embodiment.
Figure 20:
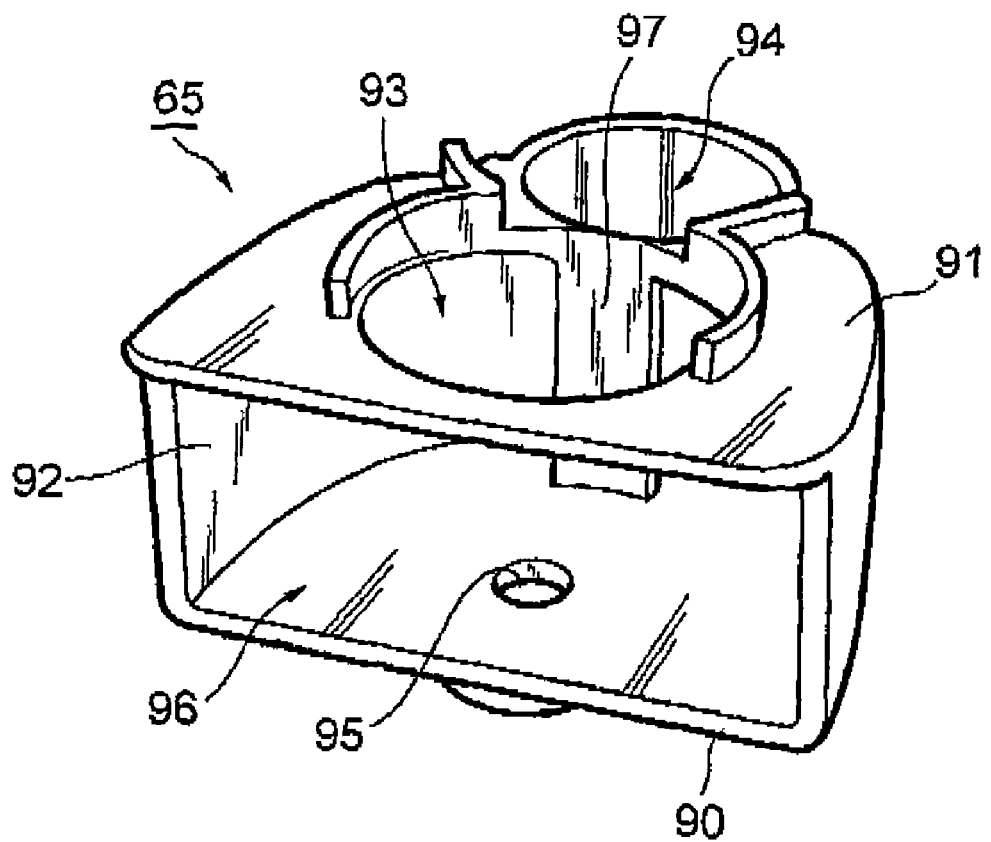
FIG. 20 is a perspective view of the air guide member, taken from a direction different from that of FIG. 19.

FIGS. 19 and 20 are perspective views of the air guide member 65 turned upside down. With reference to FIGS. 19 and 20, the air guide member 65 includes top and bottom plates 90, 91 vertically spaced apart from each other and each having a substantially half elliptic shape. The rounded peripheral portions of the top and bottom plates 90, 91 are surrounded by a sidewall 92.

The bottom plate 91 has a first opening 93 for receiving the second tubular boss 80 of the lower element 63 and a second opening 94 for receiving the second circumferential flange 81 of the lower element 63. On the other hand, the top plate portion 90 is formed with a fourth bolt hole 95 (FIGS. 20 and 21) in a position for alignment with the second bolt hole 82 in the top wall of the second tubular boss 80.

The air guide member 65 has a clean air intake 96 that opens laterally for introducing air cleaned by filtration, for example. The first opening 93 is disposed upstream of the second opening 94 in the direction of alignment of the first and second openings 93, 94. That is, the air guide member 65 is configured to widely open externally through the clean air intake 96 at one side. The first opening 93 is disposed upstream, and the second opening 94 is disposed downstream, of the flow direction or air introduced from the clean air intake 96 into the air guide member 65. As already explained, the first opening 93 communicates with the fresh air passage 54a of the carburetor 54, while the second opening 94 communicates with the air-fuel mixture passage 54b of the carburetor 54. As best shown in FIG. 20, a reinforcing rib 97 is provided between the first and second openings 93, 94 to extend vertically between the bottom and top plates 91, 90.

Figure 21:
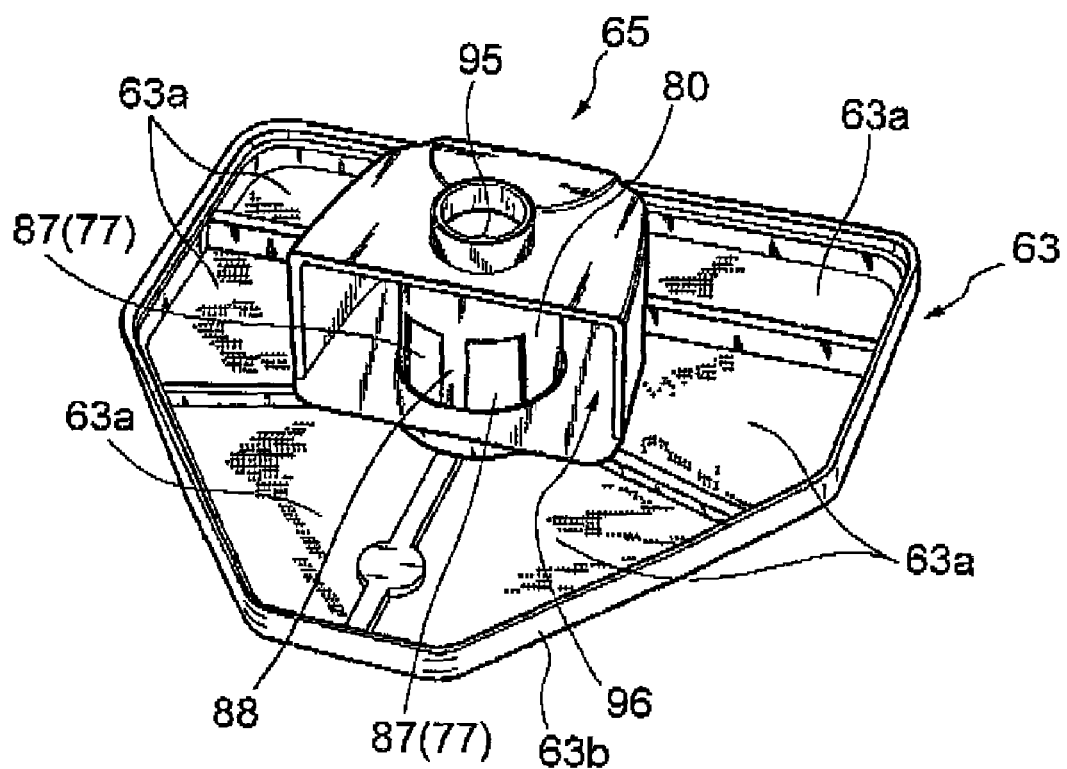
FIG. 21 is a perspective view of a lower element of an air cleaner element in the air cleaner, which is assembled with an air guide member.
Figure 22:
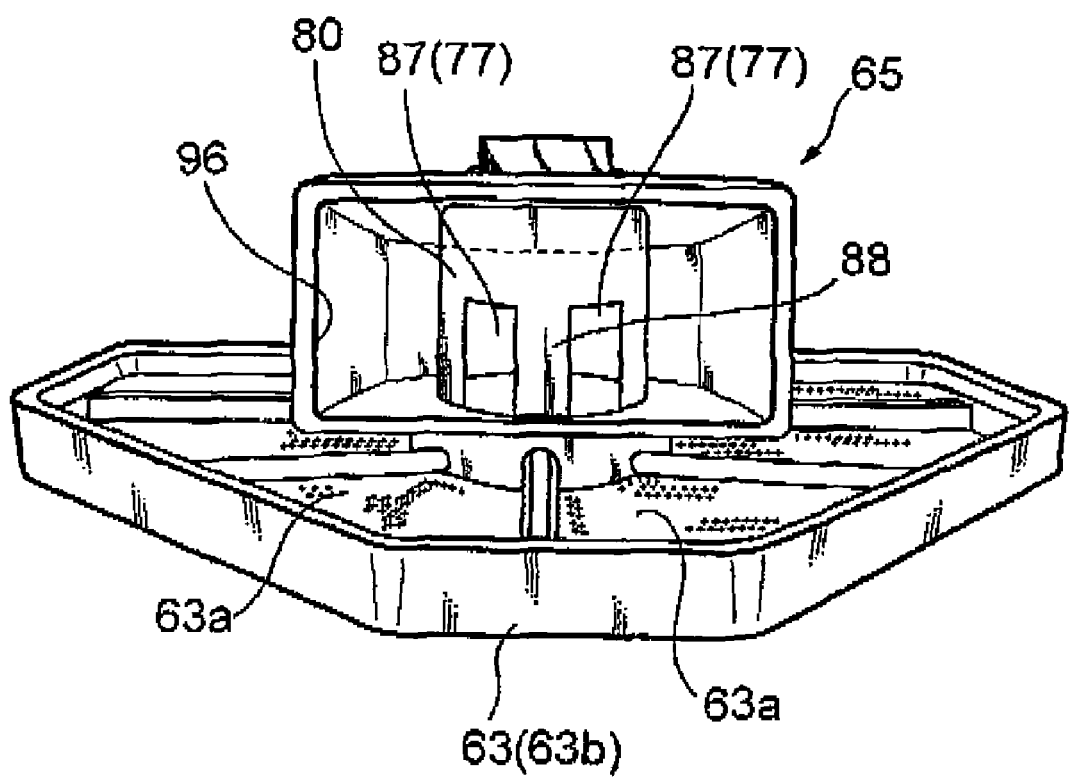
FIG. 22 is a front elevation of the lower element of the air cleaner element, which is assembled with the air guide member.
Figure 23:
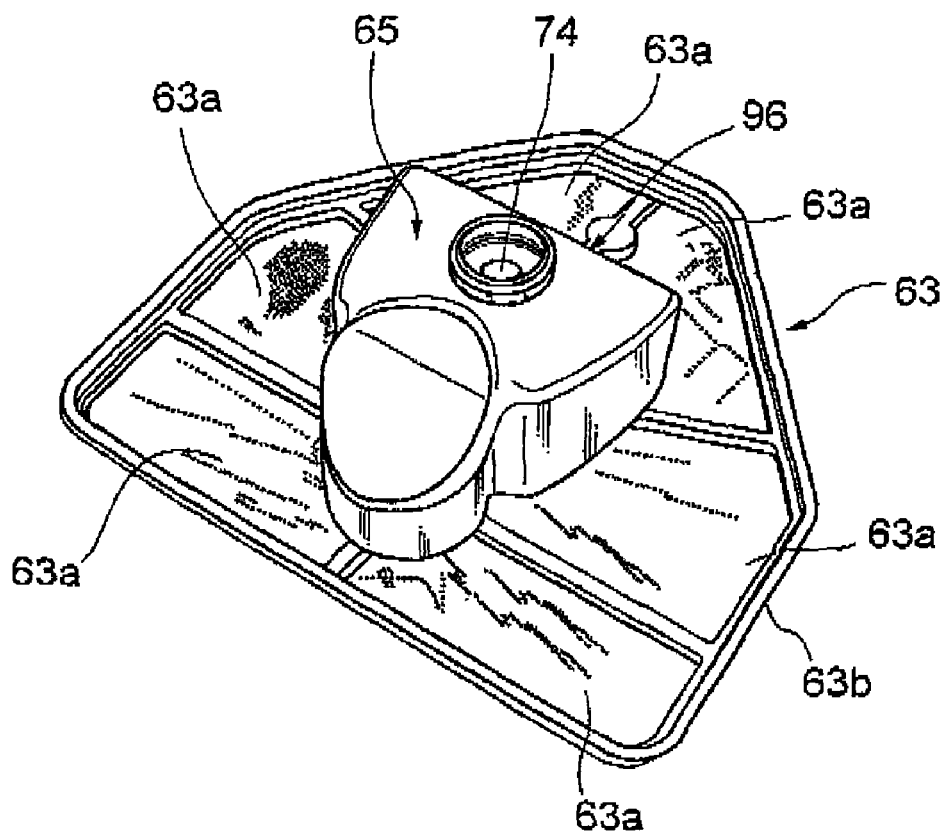
FIG. 23 is a perspective view of the lower element of the air cleaner element, which is attached with the air guide member, taken from another angle.
Figure 24:
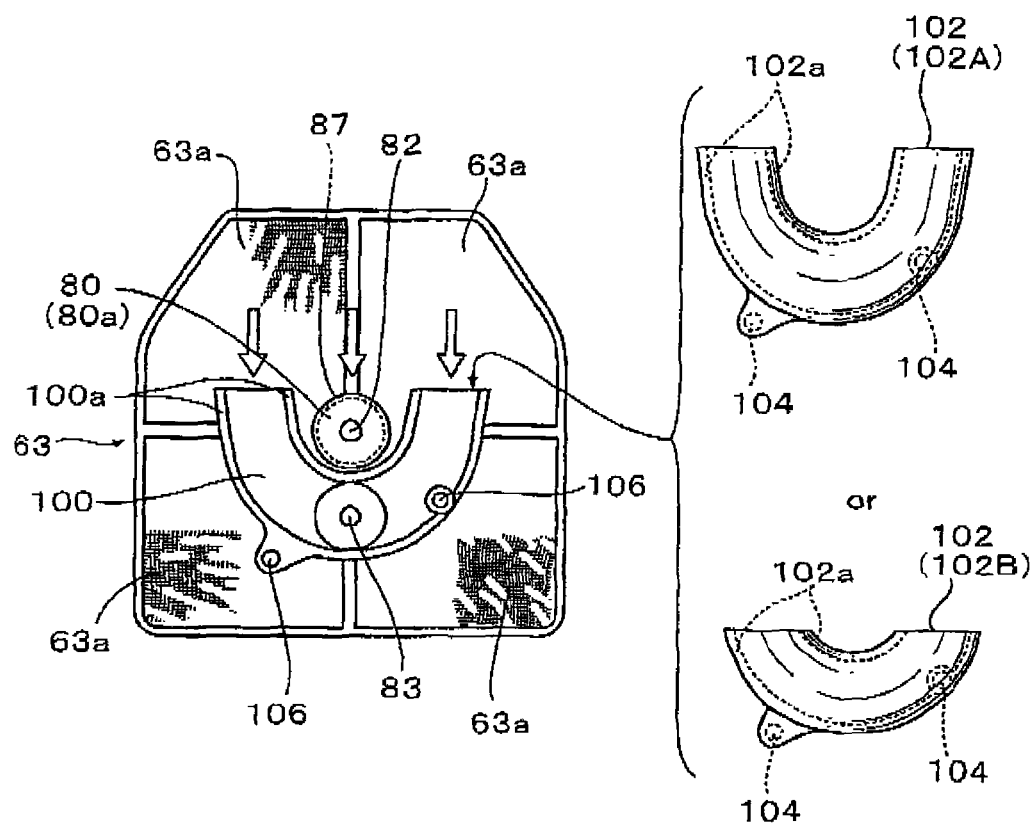
FIG. 24 is a plan view of a lower element of an air cleaner included in an air cleaner according to a second embodiment of the invention.
Figure 25:
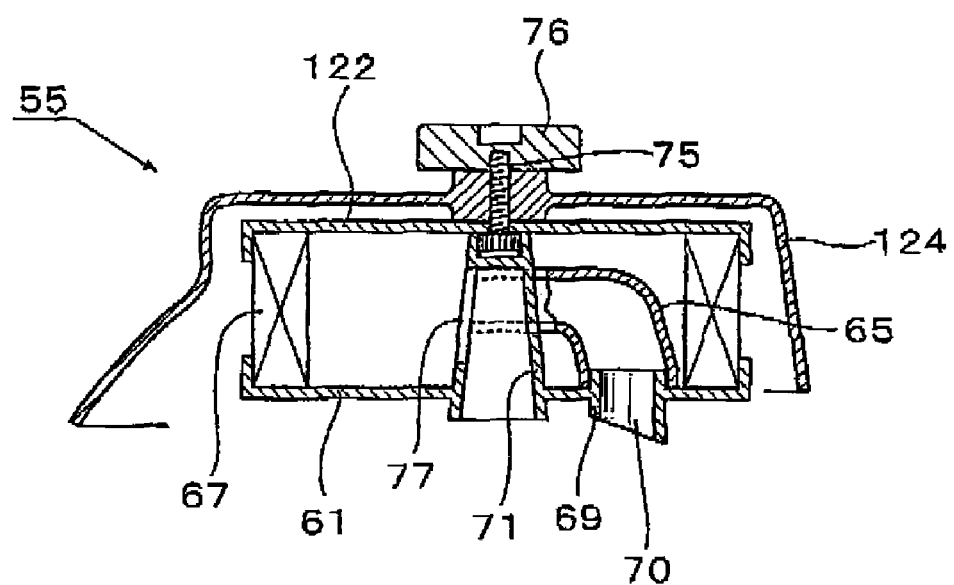
FIG. 25 is a diagram for explaining a third embodiment of the invention.

FIGS. 21 to 23 show the air guide member 65 mounted in position. In FIGS. 21 to 23, the air cleaner base 61, the outer case 62, and the upper element 64 have been removed to show the relationship between the air guide member 65 and the lower element 63.

The air guide member 85 receives the second tubular boss 80 of the lower element 63 in the first opening 97, and receives the second circumferential flange 81 of the lower element 73 in the second opening 94. Thus, the air guide member 65 is positionally determined relative to the lower element 63 and the air cleaner base 61. The air cleaned by the air cleaner element 67 is introduced into the air guide member 65 through the clean air intake 96, then enters the fresh air passage 54a of the carburetor 54 through the fresh air opening 77, and also enters the air-fuel mixture passage 54b of the carburetor 54 through the air-fuel mixture opening 70.

Therefore, the length of the air-fuel mixture opening 70 of the air cleaner base 61 is extended up to the clean air intake 96 by an inner passage of the air guide member 65 extending in an approximately L-shaped geometry. The fresh air opening 77 of the tubular boss 71 protruding from the air cleaner base 61 opens at substantially the same level as that of the clean air intake 96 (FIGS. 21 and 22). The fresh air opening 77 opens toward the clean air intake 96 of the air guide member 65. In other words, the fresh air opening 77 opening to the inner passage of the air guide member 65 opens in a direction opposite from the air-fuel mixture opening 70 at the same level as the level thereof.

Although not indispensable, the effective sectional area of the passage formed inside the air guide member 65 to permit mixture-use air to pass through is preferably designed to be substantially equal to that of the air-fuel mixture passage formed in the carburetor 54 and the cylinder block 2. This enables to adjust the length of the passage for optimization of inertial intake, for example, of the two-stroke engine by changing the length of the inner passage of the air guide member 65, that is, the length of the mixture-use air extension passage from the clean air intake 96 to the air-fuel mixture opening 70.

This means that the length of the inner passage can be changed by simply mounting a selected one of air guide members 65 different in length of the mixture-use air extension passage from the air-fuel mixture opening 70 communicating with the air-fuel mixture passage 54b of the carburetor 64 to the clean air intake 96. This leads to the following technical advantages among others.

(1) It is possible to deliver an engine 1 tuned in engine characteristics from those as manufactured, by selectively attaching a chosen one of some prepared air guide members 65, which are different in length of the internal path (mixture-use air passage) and in volume of the mixture-use air extension passage, to satisfy a particular request of every user, for example. In this manner, it is possible to cope with various requests of different users to their satisfaction by incorporating into the engine 1 a particular one of air guide members 65 for optimally balancing the engine power, torque, suppression of blown-back of the air-fuel mixture, air intake noise, and others.

(2) By preparing a standard model of the engine 1 already incorporating an air guide member 65 with a certain length of internal path optimum for total balance of engine power, torque, suppression of blown-back of the air-fuel mixture, air intake noise, and others, while preparing optional types of air guide members 65 with internal path lengths suitable for high revolution, for high torque, or for other purposes, it is possible to permit each user to optionally tune the standard model by replacing its air guide member 65 with another one selected to satisfy his/her particular request.

(3) The length of the passage can be tuned to optimize, for example, the inertia-effect in the intake system of the two-stroke internal combustion engine 1. Therefore, by tuning the substantial length of the passage from the clan air intake 96 to the air-fuel mixture opening 70, the air intake system can be tuned from its design value to optimize, for example, the inertia-effect in the intake system of the two-stroke engine 1.

In the above-described air cleaner 55, the mixture-use air extension passage from the clean air intake 96 to the air-fuel mixture opening 70 communicating with the air-fuel mixture passage 54b of the carburetor 54 is bent by about 90 degrees. In other words, since the upper portion of the air-fuel mixture opening 70 communicating with the air-fuel mixture passage 54b of the carburetor 54 is covered by the top plate portion 90 of the air guide member 65 provided like a roof, the fuel component in the air-fuel mixture blown-back from the carburetor 64 is received by the top plate portion 90, and even after entering into the air guide member 65, it is less likely to move upstream of the position where the air-fuel mixture opening 70 opens. In addition, since the fresh air opening 77 communicating with the fresh air passage 54a of the carburetor 54 is located upstream of the air-fuel mixture opening 70, the fuel component in the blown-back gas can be restricted to intrude into the fresh air opening 77. Furthermore, since the sidewall 92 of the air guide member 65 is widened, the flow rate of the air-fuel mixture decelerates, and the fuel component in the blown-back air-fuel mixture is prevented from flying everywhere.

Further, the air cleaner 55 of this embodiment has a higher effect of preventing intrusion of the fuel component in the blown-back gas into the fresh air opening 77 because the fresh air opening 77 communicating with the fresh air passage 154a of the carburetor 154 is formed on the hollow tubular boss 71 standing inside the air guide member 65, and it is formed in a location of the sidewall of the tubular boss 71 opposite from the location of the air-fuel mixture opening 70.

Also, the air cleaner 55 of this embodiment is configured to fix the outer case 62 with the bolt 75 inserted in the bolt insertion hole 73 formed in the top wall 71a at the top end or the tubular boss 71, it can be simplified in structure as compared with a structure having a bolt insertion boss at a different location.

As supplemental information, note that conventional air cleaners had the boss for a bolt for detachably joining the outer case in a location offset from the air intake as shown in some drawings of Document 2.

Moreover, the air cleaner 55 of this embodiment can be simplified in structure because the tubular boss 71 prepared for fixing the outer case 62 functions to set the air cleaner element 67 in position, and makes it possible to omit particular elements dedicated to this purpose.

Further, as already explained, since the air guide member 65 is a discrete, detachable member from other components of the air cleaner 55, the mixture-use air extension passage extending from the air-fuel mixture opening 70 communicating with the air-fuel mixture passage 54b of the carburetor 54 to the clean air intake 96 can be readily adjusted in length so as to optimize the length of the air guide passage communicating with the air-fuel mixture passage 54b of the carburetor 54, and hence optimize the length of the air-fuel mixture passage in the entire intake system 50 of the engine 1, by mounting on the air cleaner 55 a selected one of air guide members 65 prepared for optional use and different in length of the passage.

In short, the air cleaner 55 of this embodiment is a proposal to selectively change the position of the air-fuel mixture opening 70 in communication with the air-fuel mixture passage 54b of the carburetor 54 by a distance in the upstream direction by using the air guide member 65 detachably mounted on the air-fuel mixture opening 70, and this makes it possible to readily set up an intake system optimum for inertial intake of the two-stroke engine 1 by simply changing the air guide member 65 from one with a certain length of passage to another with a different length of passage. From this standpoint, it is also possible to use a passage extension member that is an independent member bent by approximately 90 degrees and can be detachably connected to the air-fuel mixture opening 70 communicating with the air-fuel mixture passage 54b of the carburetor 54.

Other various embodiments of the present invention will be described below, focusing at their own features while omitting explanation of elements identical or equivalent to those already explained by simply labeling them with the same reference numerals.

Second Embodiment

FIG. 24

The second embodiment is directed to an air cleaner in which the air guide member 65 is partly defined by the lower element 63. The lower element 63, in combination with the upper element 84 (FIG. 17), defines the air cleaner element, and the lower element 63 has a second tubular boss 80 corresponding to the first tubular boss 71 (communicating with the fresh air passage 54a of the carburetor 54) of the air cleaner base 61 and a first inlet 83 communicating with the air-fuel mixture opening 70 (communicating with the air-fuel mixture passage 54b of the carburetor 54) of the air cleaner base 61.

In this embodiment the lower element 63 has a bottom wall 100 extending in a bilateral direction with respect to the first inlet 83 in a U-shaped geometry in its plan view, and the bottom wall 100 has first flanges 100a along its both side edges. The bottom wall 100 defines a part of the air guide member 65.

That is, in this embodiment, the air guide member 65 is composed of the bottom wall 100, which includes the first flanges 100a along its both side edges, and a half member 102 having an arcuate cross section corresponding to the bottom wall 100 The arcuate half member 102 has second flanges 102a along its both side edges, and the second flanges 102a join the first flanges 100a of the bottom wall 100 to define the sidewall of the air guide member 65.

For instance, a longer arcuate half member 102A and a short arcuate half member 102B may be prepared, and one of these half members 102A and 102a may be selected and mounted as the half member 102 on the lower element 63. For example, a plurality of pins 104 may be formed integrally with the arcuate half member 102, and a plurality of holes 106 may be provided on the lower element 63, such that the arcuate half member 102 can be united with the bottom wall 100 by inserting the pins 104 into the holes 106. Since the pins 104 and the holes 106 are members only for mating with each other, it is also acceptable to provide the holes 108 on the arcuate half member 102 and the pins 104 on the lower element 63.

According to the second embodiment, a plurality of arcuate half members 102 different in length of their arms, such as the long arcuate half member 102A and the short arcuate half member 102B, may be prepared such that an engine 1 assembled with a selected one of them can be delivered to each particular user.

Third Embodiment

FIG. 25

The third embodiment is directed to an air cleaner 55 having a modified air cleaner element 67. The air cleaner element 67 used here has a shape of a ring as a whole. The ring-shaped air cleaner element 67 is assembled in the air cleaner 55 in a configuration sandwiched between the air cleaner base 61 and a top plate 122 that are spaced apart from each other. Then, a cover 124 is assembled to cover the entirety of the air cleaner base 61, air cleaner element 67 and top plate 122. Note that the air guide member 65 used in the third embodiment is a tubular member curved in an L-shaped geometry when viewed in a side elevation, and the L-shaped tubular member 65 is in detachable fitting engagement with the circumferential flange 69 around the air-fuel mixture opening 70 of the air cleaner base 61.

Fourth Embodiment

Figure 26:
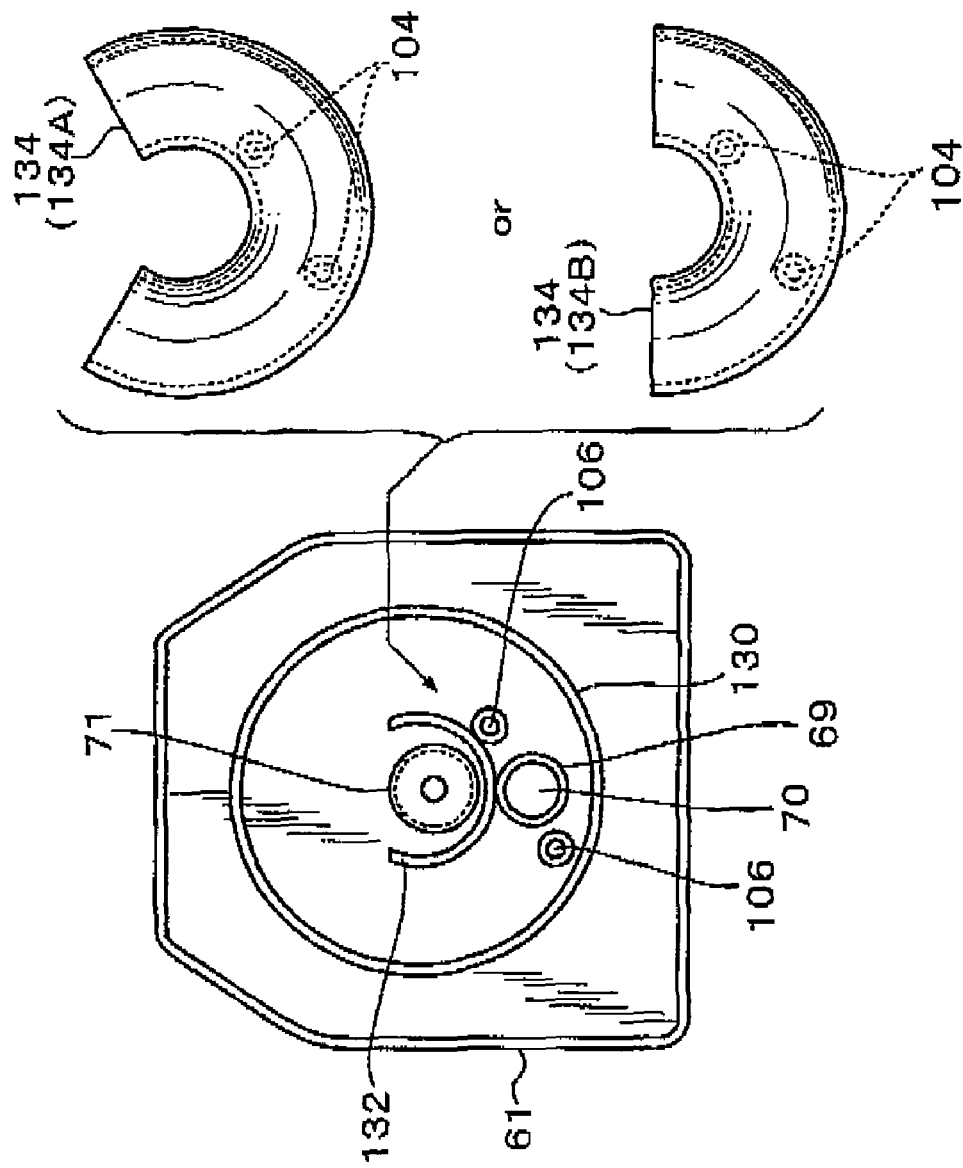
FIG. 26 is a plan view of an air cleaner base in an air cleaner according to a fourth embodiment of the invention.
Figure 27:
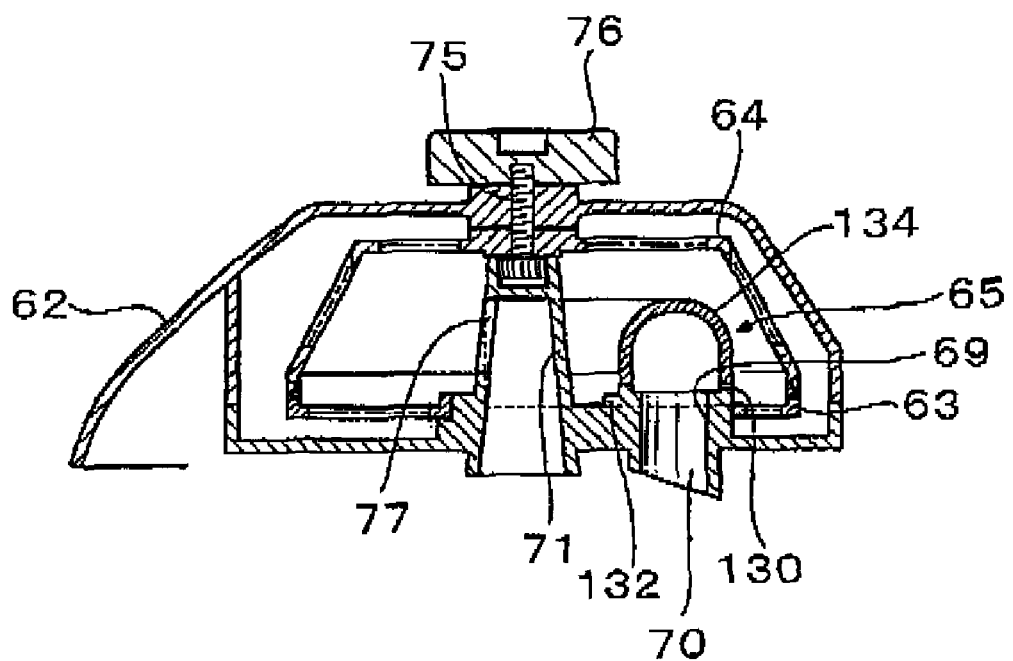
FIG. 27 is a sectional view of the air cleaner according to the fourth embodiment of the invention.
Figure 28:
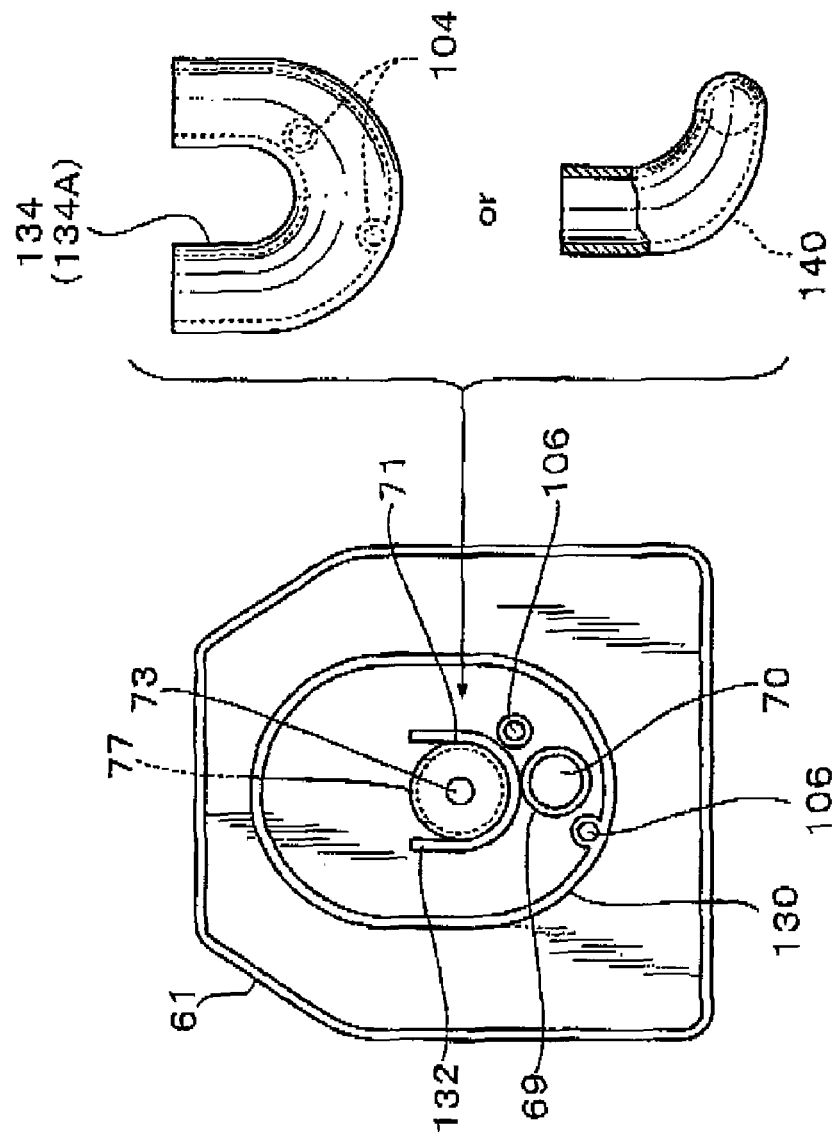
FIG. 28 is a plan view of an air cleaner base in an air cleaner according to a fifth embodiment of the invention.

FIGS. 26 and 27

This embodiment is directed to an air cleaner 55 in which a part of the air guide member 65 is substituted with the air cleaner base 61. That is, the air cleaner base 61 is formed. With an outer circular ridge 130 surrounding the first tubular boss 71 communicating the fresh air passage 54a of the carburetor 54 and the air-fuel mixture opening 70 communicating with the air-fuel mixture passage 54b of the carburetor 54, and an inner arcuate ridge 132 surrounding the first tubular boss 71.

The inner and outer ridges 130, 132 cooperate with an arcuate half member 134 to make the air guide member 65. That is, the arcuate half member 134 includes an arcuate shape when viewed in a horizontal plane, and a reverse U-shaped cross section. Thus, the air guide member 65 extending in a bilateral arcuate geometry from the air-fuel mixture opening 70 is formed when the lower ends of opposite sidewalls of the arcuate half member 134 sit on the inner and outer ridges 130, 132.

A longer second arcuate half member 134A and a shorter arcuate half member 134B, for instance, may be prepared such that a selected one of these arcuate half members, 134A or 134B, can be mounted on the air cleaner base 61.

Fifth Embodiment

FIGS. 28 to 31

Figure 29:
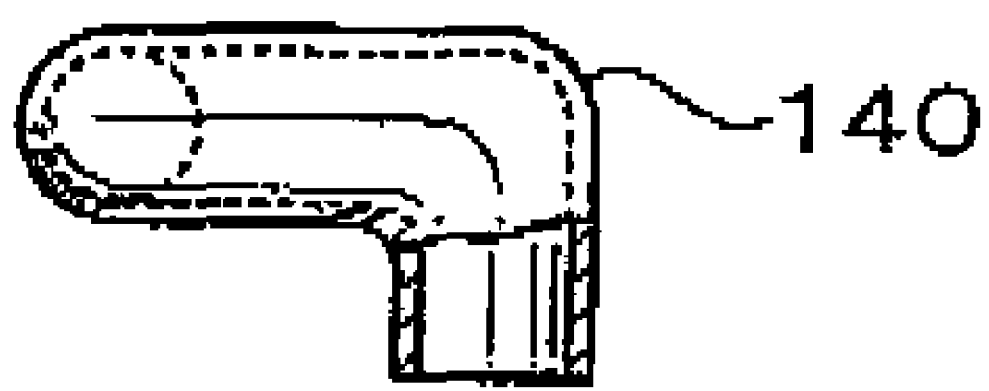
FIG. 29 is a partly cut-out side elevational view of a tubular L-shaped air guide member that can be mounted in the air cleaner according to the fifth embodiment of the invention.

The fifth embodiment is a modification of the fourth embodiment. Although the fourth embodiment has been directed to a combination with two kinds of arcuate half members 134A, 134B that are different in length, the fifth embodiment prepares a tubular member 140 curved in an L-shaped geometry (FIGS. 28 and 29) in lieu of one of the arcuate half members 134A, 134B (for example, the shorter arcuate half member 134B). FIG. 29 is a partly sectioned side elevational view of the L-shaped tubular member 140. When the L-shaped tubular member 140 is selected, it is fixed to the air cleaner base 61 by bringing the lower end of the L-shaped tubular member 140 into engagement with the circumferential flange 69 around the air-fuel mixture opening 70 of the air cleaner base 61.

Figure 30:
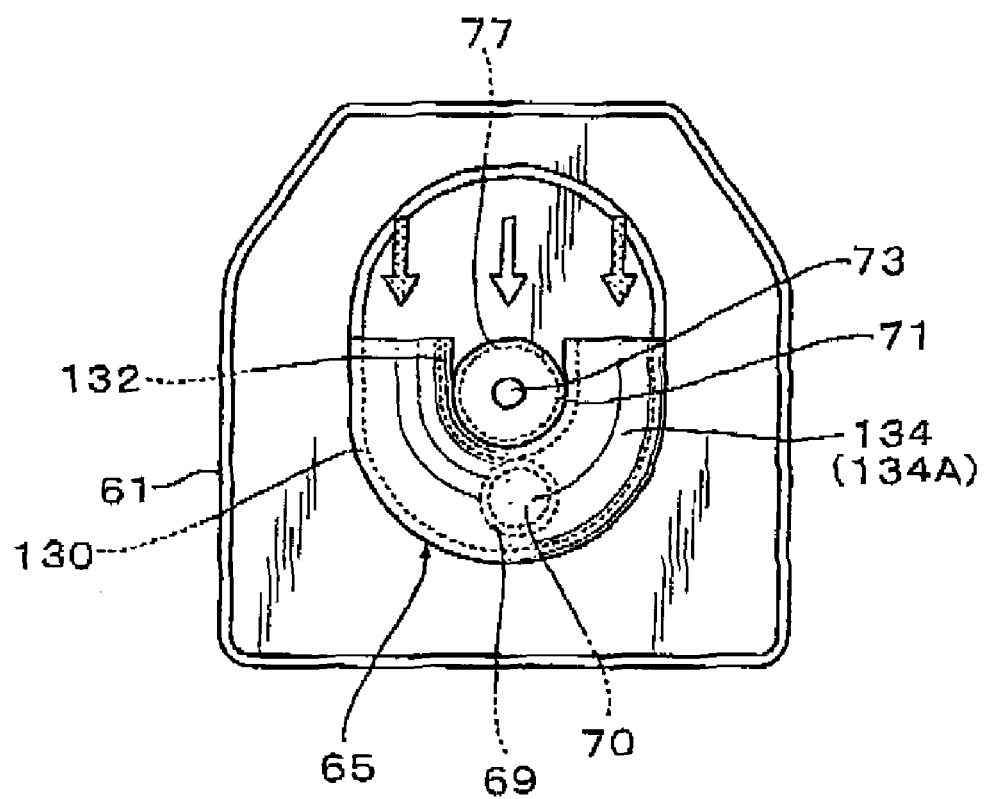
FIG. 30 is a plan view of the air cleaner base for illustrating a mixture-use air extension passage made by selecting and assembling a horseshoe-arcuate half member as a part of the air guide member of the air cleaner according to the fifth embodiment of the invention.
Figure 31:
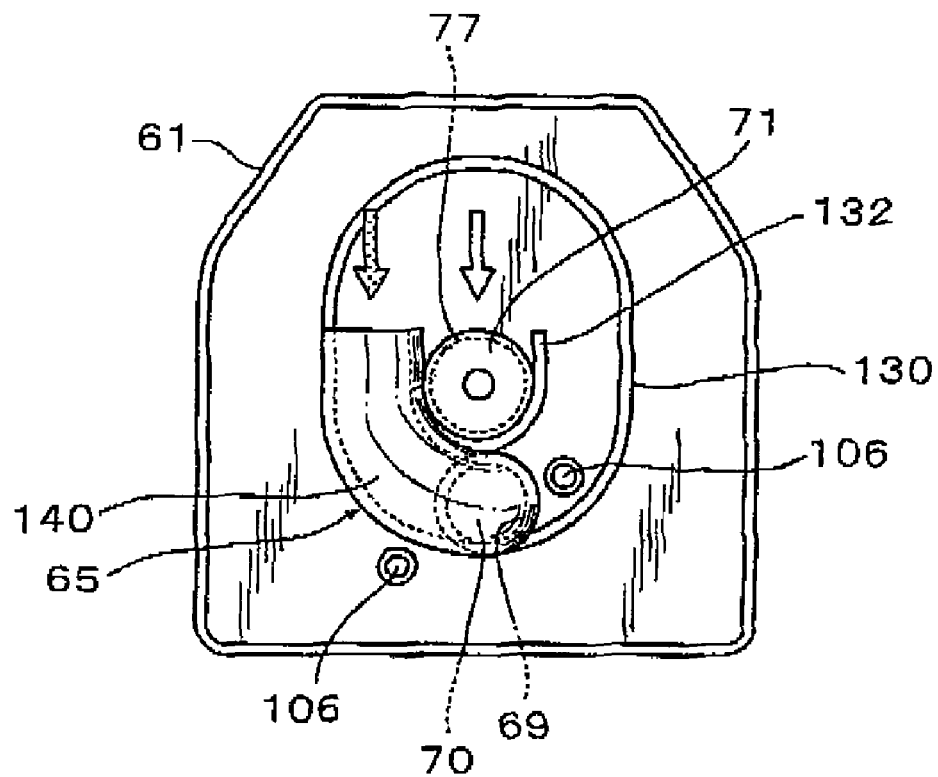
FIG. 31 is a plan view of an air cleaner base for illustrating a mixture-use air extension passage made by selecting and assembling an L-shaped tubular member as a part of the air guide member of the air cleaner according to the fifth embodiment of the invention.
Figure 32:
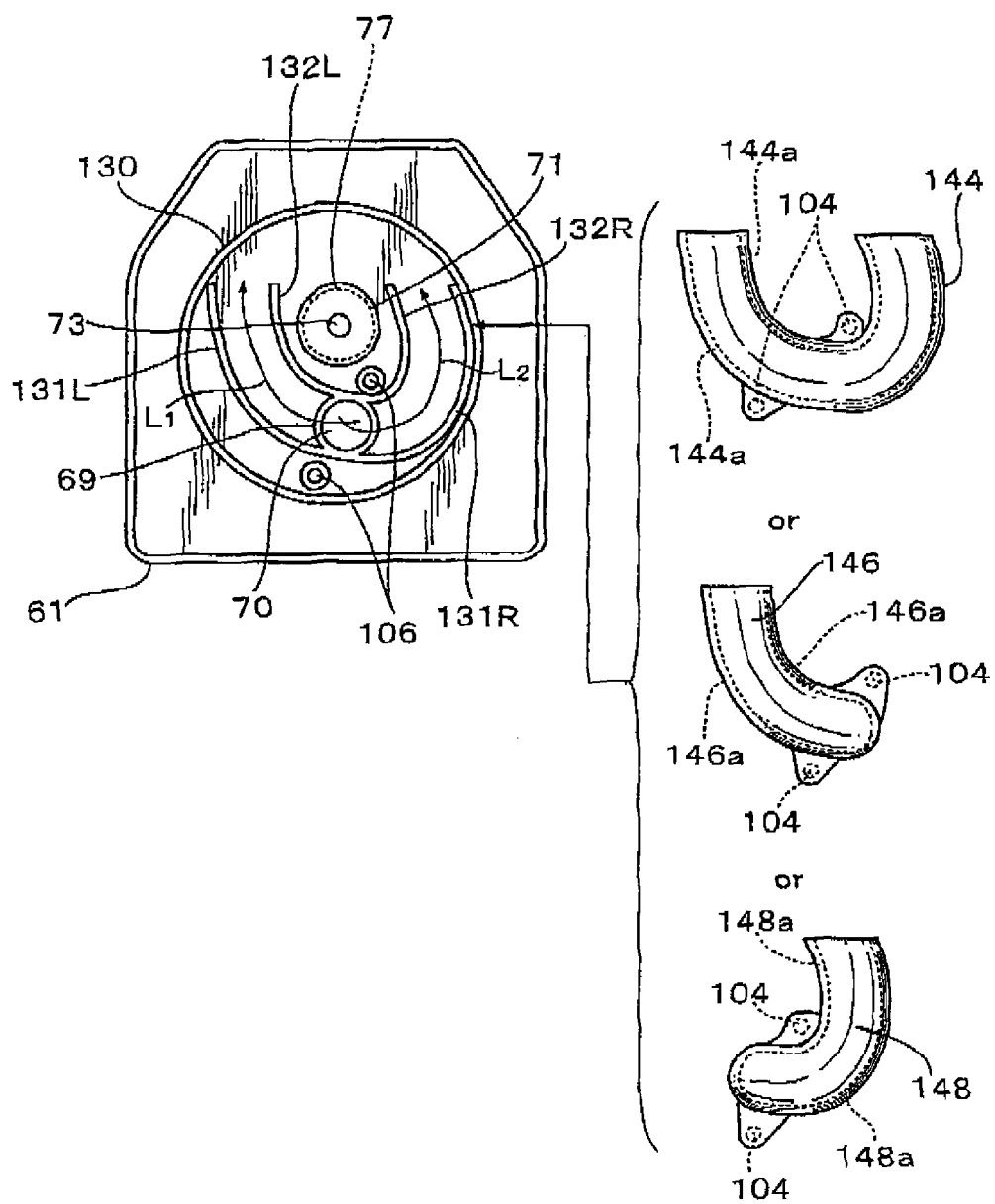
FIG. 32 is a plan view of an air cleaner base in an air cleaner according to a sixth embodiment of the invention.

FIG. 30 shows a configuration of the combination in which the arcuate half member 134A has been selected and mounted on the air cleaner base 61. FIG. 31 shows a configuration of the combination in which the L-shaped tubular member 140 is selected and mounted on the air cleaner base 61. It will be apparent from FIGS. 30 and 31 that, by preparing the arcuate half member 134 and the L-shaped tubular member 140 and by mounting a selected one of them on the air cleaner base 61, air guide member 65 different in length and volume of the mixture-use air extension passages can be set up.

Sixth Embodiment

FIG. 32

The sixth embodiment is a modification from the fourth and the fifth embodiments. In this embodiment, outer and inner arcuate ridges 131, 132 are provided inside the outer circular ridge 130. Right halves and left halves of the arcuate ridges 131, 132 at right and left sides of the air-fuel mixture opening 70 are different in length, width and curvature from each other. In this connection, a plurality of holes 106 of the air cleaner base 61 are provided in bilateral asymmetry with respect to the air-fuel mixture opening 70.

Three kinds of half members 144, 146 and 148 are prepared for combination with the air cleaner base 61 shown here. The first half member 144 has a U-shaped geometry (in its plan view) extending toward either sides of the air-fuel mixture opening 70 of the air cleaner base 61. Therefore, if the first half member 144 is selected, the air guide member 65 extending in bilateral directions from the air-fuel mixture opening 70 can be set up.

The second half member 146 has a shape corresponding to the left side of the air-fuel mixture opening 70 of the air cleaner base 61. Therefore, if the second half member 146 is selected, the air guide member 65 extending to the left from the air-fuel mixture opening 70 can be made by combination of the second half member 146 with the arcuate ridges 131L, 132L in the left side of the air cleaner base 61.

The third half member 148 has a shape corresponding to the right side of the air-fuel mixture opening 70 of the air cleaner base 61. Therefore, if the third half member 148 is selected, the air guide member 65 extending to the right from the air-fuel mixture opening 70 can be formed by combination of the third half member 148 with the arcuate ridges 131R, 132R in the right side of the air cleaner base 61.

As explained above, since the left arcuate ridges 131L, 132L and the right arcuate ridges 131R, 132R are different in length, width and curvature, three different kinds of air guide members 65 can be made by using three kinds of half members 144, 146, 148. Needless to say, the inlet and the cross section of the left mixture-use air extension passage formed by combination of the left arcuate ridges 131A, 132L with the second half member 146 may be different from or identical to those of the right mixture-use air extension passage formed by combination of the right arcuate ridges 131R, 132R with the third half member 148.

Seventh Embodiment

FIGS. 33 to 36

In the air cleaner 200 according to the seventh embodiment, an air guide member 65 is brought into detachable engagement with the circumferential flange 69 encircling the air-fuel mixture opening 70 of the air cleaner base 61. The air guide member 65 includes a proximal portion 65a (FIG. 34) vertically extending from the air cleaner base 61 and a distal portion 65b extending horizontally from the upper end of the proximal portion 65a, where the guide member 65 is bent by an angle around 90 degrees. In outer configuration of the air guide member 65, the proximal portion 65a has an elliptic cross section, while the distal portion 65b has a shape of a flat sector widened toward its distal end in its plan view. The air guide member 65, however, is substantially constant in cross-sectional area throughout its entire length.

The air guide member 65 is fixed to the air cleaner base 61 in a predetermined posture by fitting engagement of its proximal portion 65a with the circumferential flange 69 of the air-fuel mixture opening 70, which extends in an elliptic geometry when viewed in a horizontal plane. Both the air-fuel mixture opening 70 of the air cleaner base 61 and the fresh air mixture opening 77 are formed in substantially the same plane as that of the bottom wall of the air cleaner base 61 (FIG. 34).

Figure 34:
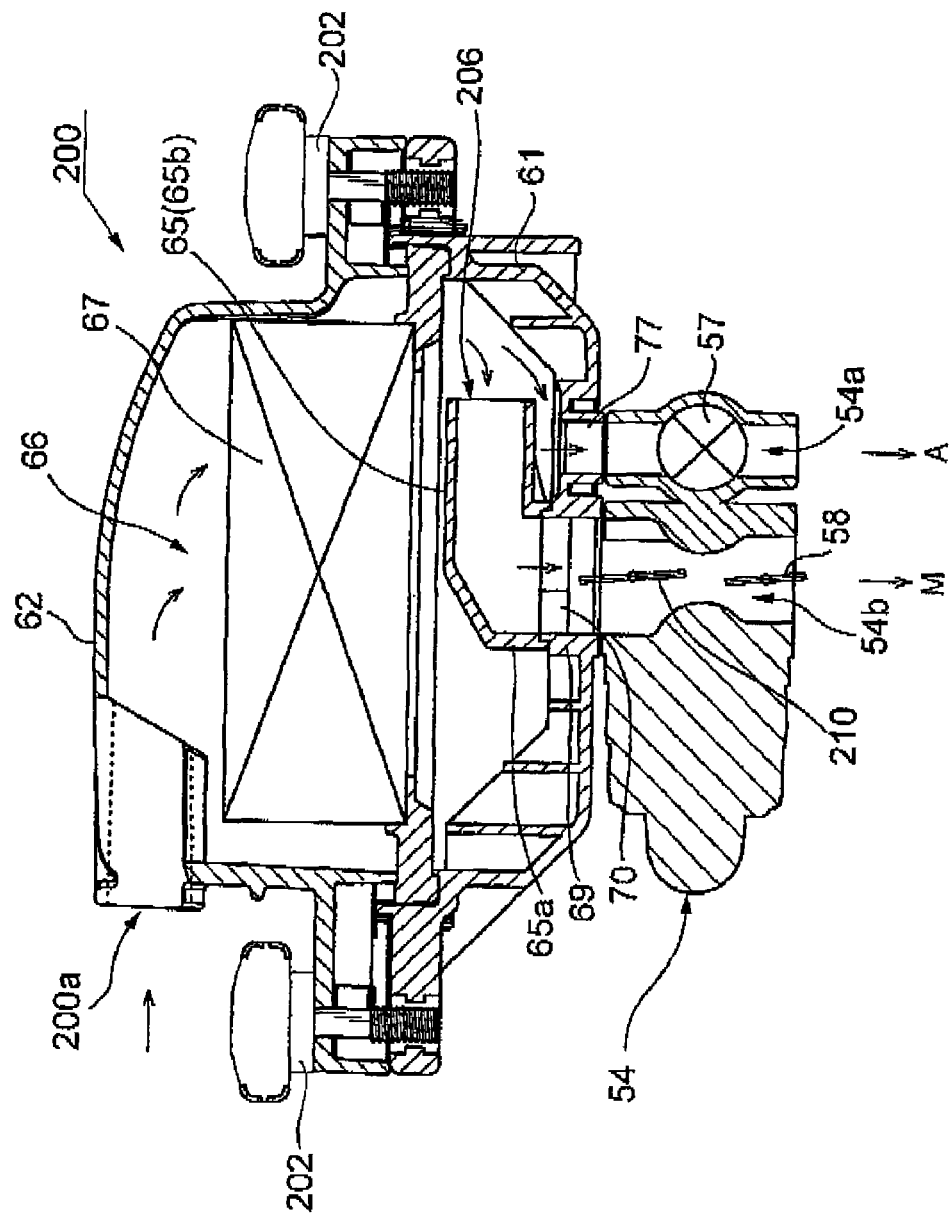
FIG. 34 is a sectional view of components of an intake system including the air cleaner according to the seventh embodiment of the invention.
Figure 35:
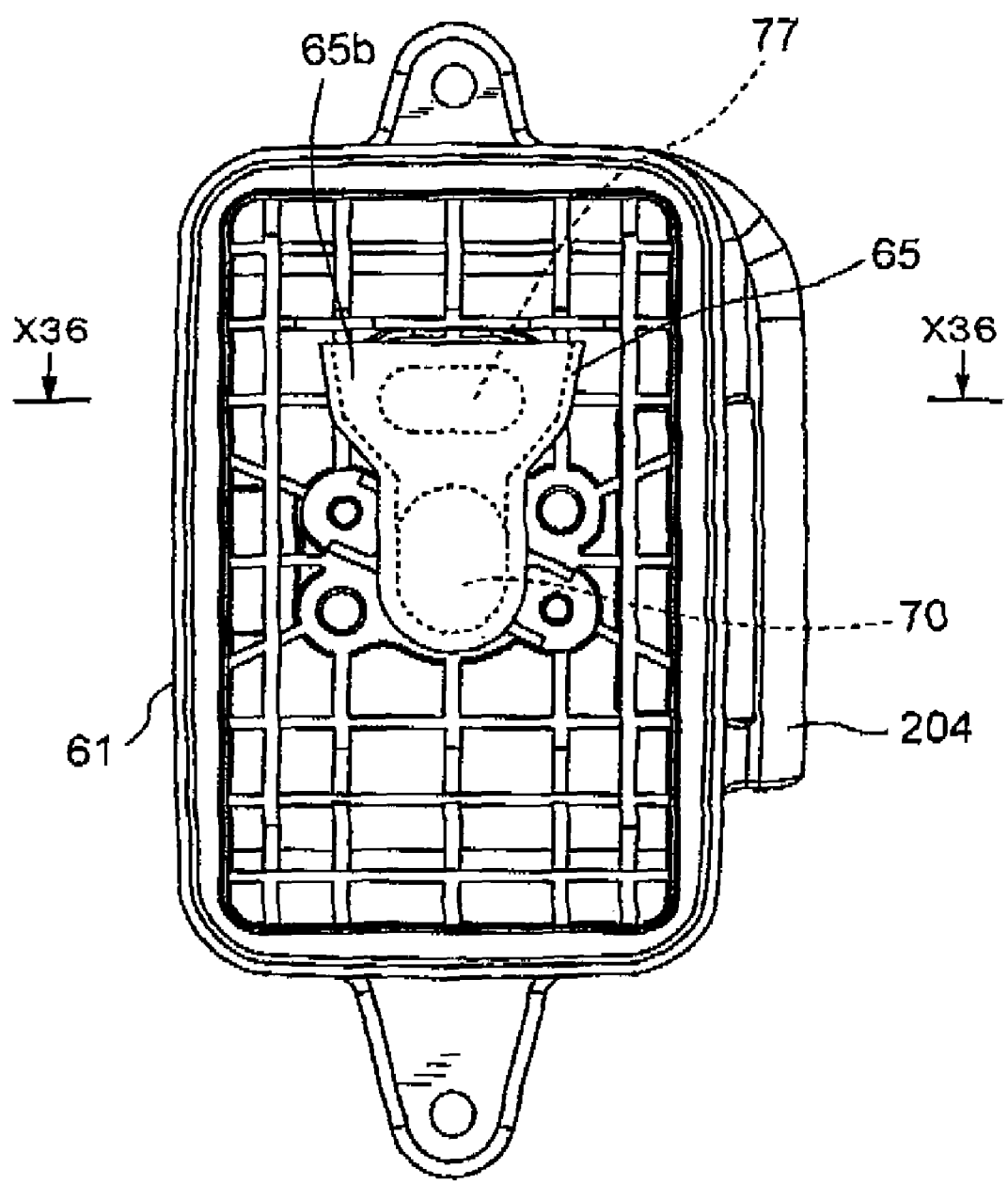
FIG. 35 is a plan view of the air cleaner according to the seventh embodiment of the present invention, from which the upper case has been removed to expose the internal structure of the air cleaner.

Each of the air-fuel mixture opening 70 and the fresh air opening 77 of the air cleaner base 61 has an elliptic shape when viewed in a horizontal plane (FIG. 35). Longer axes of the air-fuel mixture opening 70 and the fresh air opening 77 extend in directions intersecting at a right angle with each other. That is, an extension line of the longer axis of the air-fuel mixture opening 70 intersects with the longer axis of the fresh air opening 77, and the midpoint of the longer axis of the fresh air opening 77 lies on the extension line of the longer axis of the air-fuel mixture opening 70. In addition, when the air guide member 65 is mounted on the air cleaner base 61, the distal portion 65b widened like a sector covers the upper region of the fresh air opening 77 (FIG. 34). Therefore, the air cleaned by the air cleaner element 67 is introduced into the air guide member 65 through a clean air intake 206 of the air guide member 65, and then supplied to the air-fuel mixture passage 54b of the carburetor 54 through the air-fuel mixture opening 70. In addition, the air cleaned by the air cleaner element 67 is supplied also to the fresh air opening 77 opening to the bottom surface of the air cleaner base 61 through the lower area of the distal portion 65b of the air guide member 65, and then introduced into the fresh air passage 54a of the carburetor 54 from the fresh air opening 77.

Figure 4:
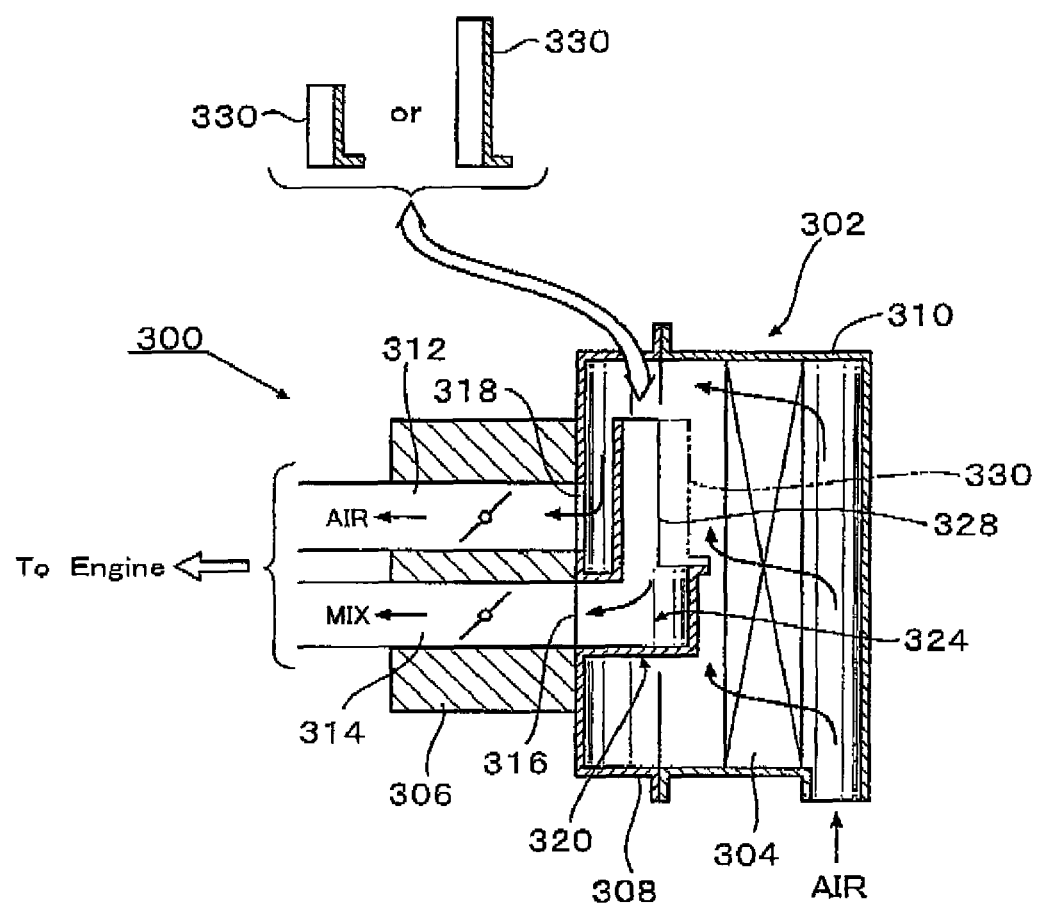
FIG. 4 is a diagram for explaining a fourth example for attaining a concept of the present invention.
Figure 33:
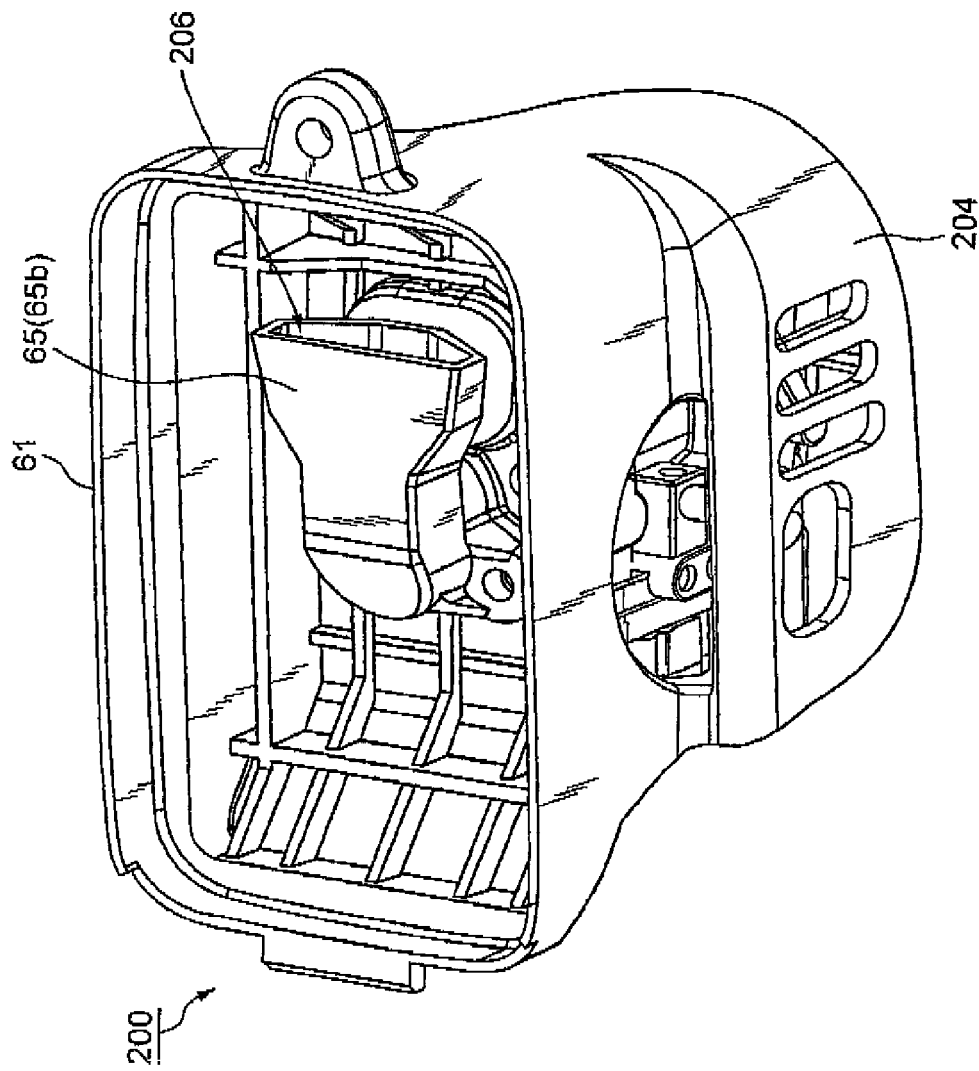
FIG. 33 is a perspective view of an air cleaner according to a seventh embodiment of the invention, from which an upper case has been removed to expose the internal structure of the air cleaner.
Figure 36:
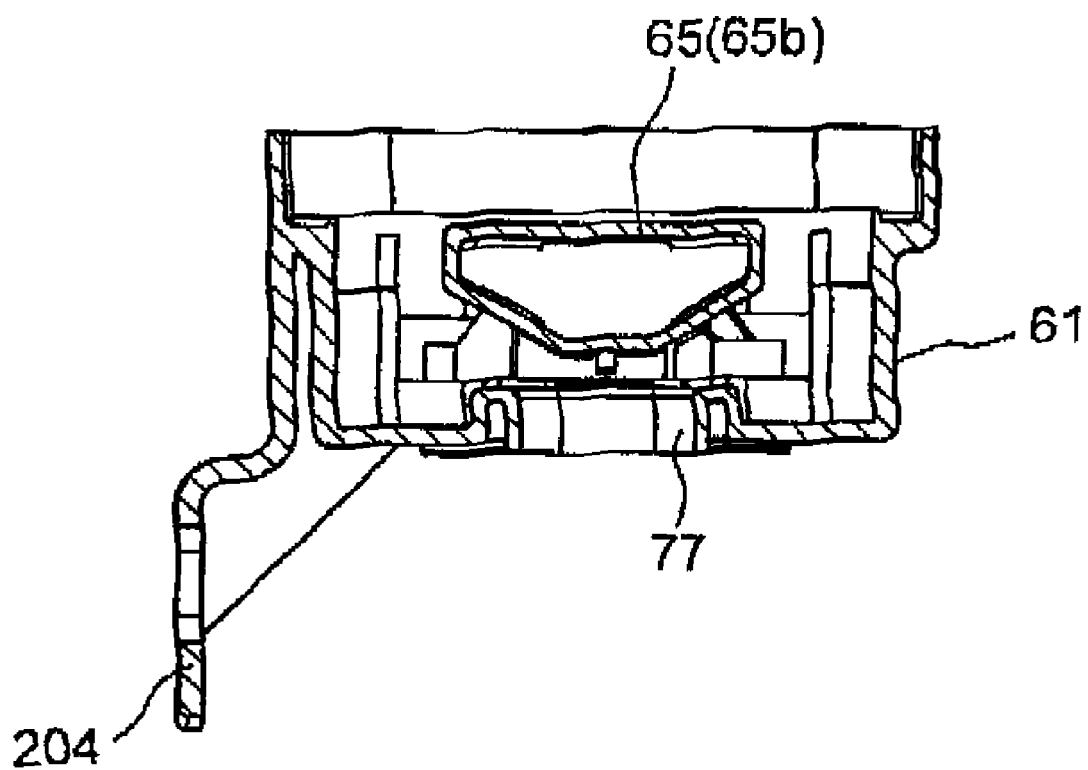
FIG. 36 is a sectional view taken along the X36-X36 line of FIG. 35.

A reference numeral 202 in FIG. 34 denotes a bolt for detachably fastening the outer case 62 to the air cleaner base 61, and a reference numeral 204 in FIG. 36 indicates a skirt portion extending downward from the outer perimeter of the air cleaner base 61 (FIGS. 33 and 35). The skirt portion 204 encloses the periphery of the carburetor 54. More specifically, a choke operating portion and a throttle driving mechanism which are located outside the carburetor 54 are covered by the skirt portion 204 of the air cleaner 200. The skirt 204 thereby prevents or alleviates the likeliness that leaves or grass scattered around an operator cling or stick to the choke operating portion and the throttle driving mechanism when the operator works with a hedge trimmer. Reference numeral 210 in FIG. 4 indicates a choke valve.

Here again in the air cleaner 200 according to the seventh embodiment, when the blown-back air-fuel mixture flows into the air guide member 65 form the air-fuel mixture passage 54b of the carburetor 54, flows of the blown-back air-fuel mixture into the inside of the air cleaner 200 from the air guide member 65 can be reduced because the fuel and oil contained in the blown-back air hit against the inner wall of the curved portion of the air guide member 65. Furthermore, even when the air containing some amount of fuel and oil is blown back to inside the air cleaner 200 from the fresh air passage 54*a* of the carburetor 54 through the fresh air opening 77, dispersion of the blown-back air inside the air cleaner 200 can be alleviated because it hits against the flat distal portion 65*b* of the air guide member 65 in the upper region of the fresh air opening 77.

As will be understood best from FIG. 34, the distal portion 65*b* of the air guide member 65 opens at a position opposite from the air intake 200*a* of the air cleaner 200. The clean air intake 206 of the air guide member 65 opens at a position opposite from the open air intake 200*a* of the air cleaner 200. This makes it possible to prevent that the air introduced into the air cleaner 200 from the air intake 200*a* of the air cleaner 200 passes through only a portion of the air cleaner element 67. In other words, it is prevented that the burden of filtering operation concentrates to a local area of the air cleaner element 67, and instead, the entire area of the air cleaner element 67 can serve to clean the outer air.

Also in the seventh embodiment, plural kinds of air guide members 65 with distal portions 65*b*, which are different in length, may be prepared such that any selected one of them can be assembled to tune the engine characteristics pursuant to a users request. Here again, it is also acceptable to prepare different kinds of air cleaner bases 61 with different kinds of built-up, unremovable air guide members 65 such that any selected one of the air cleaner bases 61 with built-up air guide members may be mounted in the engine to tune the engine characteristics to satisfaction of each user.

What is claimed is:

1. An air cleaner for a two-stroke internal combustion engine in which a carburetor composes a part of an intake system of the engine and defines an air-fuel mixture passage for preparing air-fuel mixture and a fresh air passage permitting fuel-free fresh air for use in stratified scavenging to pass through, such that the air cleaner supplies the air-fuel mixture passage and the fresh air passage of the carburetor with air cleaned by an air cleaner element, said air cleaner comprising:
   an air cleaner base including an air-fuel mixture opening communicating with the air-fuel mixture passage of the carburetor and a fresh air opening communicating with the fresh air passage of the carburetor, and detachably attached to a component of the intake system; and
   an air guide member provided at the air-fuel mixture opening of the air cleaner base,
   wherein the air guide member is configured to curve near the air-fuel mixture opening and extend from there along the air cleaner base, and has a cross section surrounded by a peripheral wall, and
   wherein the air guide member defines a first clean air intake for introducing the cleaned air into the air guide member and defines a mixture-use air extension passage extending between the first clean air intake thereof and the air-fuel mixture opening of the air cleaner base.

2. The air cleaner according to claim 1, wherein the air guide member is detachable from the air cleaner base.

3. The air cleaner according to claim 1, wherein a half member is detachably provided on a distal end portion of the air guide member to increase a length of the mixture-use air extension passage of the air guide member.

4. The air cleaner according to claim 1, wherein the peripheral wall of the air guide member in a distal end region thereof is partly cut out, and a complementary peripheral wall member is detachably mounted at the partly cut-out portion of the peripheral wall.

5. The air cleaner according to claim 1, wherein the air cleaner base further includes a tubular boss standing upright from the fresh air opening and located inside the air guide member,
   wherein a second clean air intake is formed in a sidewall of the tubular boss to open in a direction opposite from the air-fuel mixture opening, and
   wherein the second air intake is located at the same level as that of the first clean air intake of the air guide member.

6. The air cleaner according to claim 5, the air cleaner element is held in position by the tubular boss.

7. The air cleaner according to claim 6, wherein the tubular boss includes a top wall having a bolt hole, and an outer case of the air cleaner is fixed to the tubular boss by a bolt inserted in the bolt hole.

8. A method of tuning a length of a mixture-use air extension passage for supplying cleaned air to an air-fuel mixture passage by using an air cleaner in a two-stroke internal combustion engine in which a carburetor composes a part of an intake system of the engine and defines the air-fuel mixture passage for preparing air-fuel mixture and a fresh air passage permitting fuel-free air for use in stratified scavenging to pass through, such that the air cleaner supplies the air-fuel mixture passage and the fresh air passage of the carburetor with air cleaned by an air cleaner element, said method comprising the steps of:
   preparing a plurality of air cleaner bases each having an air-fuel mixture opening communicating with the air-fuel mixture passage of the carburetor and a fresh air opening communicating with the fresh air passage of the carburetor,
   wherein each said air cleaner base comprises an air guide member unremovably joined at the air-fuel mixture,
   wherein the air guide member is configured to curve near the air-fuel mixture opening and extend from there along the air cleaner base, and has a cross section surrounded by a peripheral wall,
   wherein the air guide members of the different air cleaner bases make different lengths of the mixture-use air extension passage, and
   wherein a selected one of the air cleaner bases is assembled in the two-stroke internal combustion engine to tune up a desired length of the mixture-use air extension passage.

9. The air cleaner according to claim 1, wherein the fresh air passage and an air-fuel mixture passage are independent from each other.

10. The method of claim 8, wherein the plurality of air cleaner bases are each detachably mountable to a component of the intake system.

* * * * *